(12) United States Patent
Minamino et al.

(10) Patent No.: US 7,269,593 B2
(45) Date of Patent: Sep. 11, 2007

(54) DATA PROCESSING APPARATUS AND METHOD

(75) Inventors: Noriko Minamino, Tokyo (JP); Hiroshi Murayama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 10/900,388

(22) Filed: Jul. 28, 2004

(65) Prior Publication Data

US 2005/0027724 A1 Feb. 3, 2005

(30) Foreign Application Priority Data

Jul. 29, 2003 (JP) ............................ P2003-203063

(51) Int. Cl.
*G06F 7/00* (2006.01)

(52) U.S. Cl. ...................... 707/100; 707/202; 707/101; 707/102; 707/103 R

(58) Field of Classification Search ................. 707/100
See application file for complete search history.

(56) References Cited

U.S. PATENT DOCUMENTS

| | | | | |
|---|---|---|---|---|
| 5,701,453 A | * | 12/1997 | Maloney et al. | ................ 707/2 |
| 5,764,973 A | * | 6/1998 | Lunceford et al. | .............. 707/1 |
| 6,629,094 B1 | * | 9/2003 | Colby et al. | ................... 707/4 |
| 6,820,076 B2 | * | 11/2004 | Bailey et al. | .................. 707/3 |
| 6,957,225 B1 | * | 10/2005 | Zait et al. | ................... 707/102 |
| 2002/0087516 A1 | * | 7/2002 | Cras et al. | ..................... 707/2 |
| 2005/0038784 A1 | * | 2/2005 | Zait et al. | ...................... 707/5 |

OTHER PUBLICATIONS

Noriko Minamino et al., "Hierarchical Structure Display Apparatus and Method," U.S. Appl. No. 10/717,707, filed Nov. 21, 2003.

* cited by examiner

*Primary Examiner*—Don Wong
*Assistant Examiner*—Binh V Ho
(74) *Attorney, Agent, or Firm*—Finnegan, Henderson, Farabow, Garrett & Dunner, L.L.P.

(57) ABSTRACT

A database hierarchically stores a plurality of classes and a plurality of contents data corresponding to each class. Each contents data has a value of each property. The plurality of contents data of selected class are divided into a plurality of groups. A display presents a first table of contents data of a selected group. A memory stores a second table of a plurality of record data. An indication unit selects a first property from the plurality of properties of the selected class, and selects a first item from a plurality of items. The contents data of the first table and record data of the second table are joined on condition that a value of the first property is equal to a value of the first item. A third table of a plurality of joined data each having a value of each property of the selected class and a value of each item is generated.

20 Claims, 31 Drawing Sheets

TB01

| PRP001 | PRP002 | PRP003 | PRP004 | PRP005 | PRP006 | PRP007 | PRP008 | PRP009 | PRP010 |
|---|---|---|---|---|---|---|---|---|---|
| COMMODITY NAME | MAKER NAME | PRODUCT CODE (KEY) | STANDARD PRICE | INTERFACE | CPU | HDD CAPACITY | STANDARD MEMORY CAPACITY | POINTING DEVICE | BATTERY TYPE |
| Dyna-T1 | T INC. | TR001 | 210000 | USB | P3-1G | 60GB | 512MB | ACCUPOINT | LITHIUM ION |
| Dyna-T2 | T INC. | TR002 | 180000 | USB | P3-1G | 20GB | 512MB | TOUCH PANEL | LITHIUM ION |
| Dyna-T3 | T INC. | TR003 | 190000 | USB | P3-1G | 30GB | 256MB | ACCUPOINT | LITHIUM ION |
| M-S1 | S INC. | SR001 | 230000 | PS/2 | P3-1G | 30GB | 512MB | ACCUPOINT | NICKEL HYDROGEN |
| M-S2 | S INC. | SR002 | 210000 | USB | P3-1G | 30GB | 256MB | TRACK BALL | LITHIUM ION |
| L-M1 | N INC. | NR001 | 220000 | USB | P3-1G | 30GB | 512MB | ACCUPOINT | LITHIUM ION |
| F-F1 | F INC. | FR001 | 198000 | PS/2 | P3-2G | 60G | 512MB | ACCUPOINT | NICKEL HYDROGEN |

FIG. 3 table 01

| PRP003 PRODUCT CODE | PRP101 NUMBER OF STOCKS | PRP102 NUMBER OF ARRIVAL OF GOODS |
|---|---|---|
| TR001 | 10 | 100 |
| TR002 | 1 | 20 |
| TR003 | 1 | 20 |

FIG. 5 table 101

| COMMODITY NAME | PRODUCT CODE | SELLING PRICE |
|---|---|---|
| Dyna-T1 | TR001 | 198000 |
| Dyna-T2 | TR002 | 150000 |
| Dyna-T3 | TR003 | 138000 |

FIG. 6

TABLE OF PRODUCT SPEC

| PART NUMBER | CPU (GHz) | WEIGHT (kg) |
|---|---|---|
| K12345 | 1.8 | 1.7 |
| A22222 | 1.0 | 2.5 |
| DDFE002 | 1.2 | 3.3 |

FIG. 7A

TABLE OF STOCKS

| PART NUMBER | NUMBER OF STOCKS |
|---|---|
| K12345 | 10 |
| PPP111 | 1 |
| A22222 | 1 |

FIG. 7B

TABLE OF SELLING PRICE

| PART NUMBER | PRICE (YEN) |
|---|---|
| K12345 | 200,000 |
| DDFE002 | 190,000 |

FIG. 7C

JOIN CONDITION (TABLE OF PRODUCT SPEC. PART NUMBER = TABLE OF STOCKS. PART NUMBER)

| PART NUMBER | CPU (GHz) | WEIGHT (kg) | PART NUMBER | NUMBER OF STOCKS |
|---|---|---|---|---|
| K12345 | 1.8 | 1.7 | K12345 | 10 |
| A22222 | 1.0 | 2.5 | A22222 | 1 |

FIG. 7D

JOIN CONDITION (TABLE OF PRODUCT SPEC. PART NUMBER = TABLE OF SELLING PRICE. PART NUMBER)

| PART NUMBER | CPU (GHz) | WEIGHT (kg) | PART NUMBER | PRICE (YEN) |
|---|---|---|---|---|
| K12345 | 1.8 | 1.7 | K12345 | 200,000 |
| DDFE002 | 1.2 | 3.3 | DDFE002 | 190,000 |

FIG. 7E

| CONTENTS - DISPLAY | | | | | | □ X |
|---|---|---|---|---|---|---|
| FILE EDITING DISPLAY MODE LANGUAGE TOOL INFORMATION OPTION | | | | | | |
| GROUP ▼ | | | | | | |
| CONTENTS ID:notepcT Name:T INC. NOTEBOOK PC | | CLASS BSU:TOPAS_TC0302 Name:NOTEBOOK PC | | SUPPLIER BSU:140/TOPAS | | |
| | NUMBER | SERIES NAME (Str) | OUTWARD SIZE (Real) (mm) | DISPLAY SIZE (Real) (inch) | DISPLAY TYPE (Str) | |
| | | | | | | ▲ |
| | 1 | DynaBook SERIES | 273.0 | 15.0 | TFT | n |
| | 2 | DynaBook SERIES | 277.0 | 15.0 | TFT | S |
| | 3 | DynaBook SS3430 SERIES | 214.0 | 11.3 | TFT | S |
| | 4 | DynaBook SERIES | 277.0 | 15.0 | TFT | In |
| | 5 | DynaBook Sattellite1800 SERIES | 274.0 | 15.0 | TFT | T |
| | 6 | DynaBook Sattellite2140 SERIES | 256.0 | 13.0 | DSTN | S |
| | 7 | DynaBook Sattellite1800 SERIES | 274.0 | 15.0 | TFT | T |
| | 8 | DynaBook SERIES | 277.0 | 15.0 | TFT | S |
| | 9 | DynaBook Sattellite6000 SERIES | 289.0 | 15.0 | TFT | T |
| | 10 | DynaBook Sattellite1800 SERIES | 274.0 | 15.0 | TFT | T |
| | 11 | DynaBook SERIES | 262.5 | 12.1 | TFT | S |
| | 12 | DynaBook SS3440 SERIES | 214.0 | 11.3 | TFT | T |
| | 13 | DynaBook Sattellite2210 SERIES | 262.5 | 12.1 | TFT | T |
| | 14 | DynaBook SERIES | 279.5 | 14.1 | TFT | T |
| | 15 | DynaBook Sattellite1800 SERIES | 274.0 | 13.3 | TFT | T |
| | 16 | DynaBook SS2000 SERIES | 229.0 | 12.1 | TFT | T |
| | | | | | | ▼ |

FIG. 8

CONTENTS - DISPLAY

FILE  EDITING  DISPLAY  MODE  LANGUAGE  TOOL  INFORMATION  OPTION  [EXECUTE JOIN OPERATION] — B1

GROUP [ ▼ ]

CONTENTS
ID:notepcT
Name:T INC. NOTEBOOK PC

CLASS
BSU:TOPAS_TC0302
Name:NOTEBOOK PC

SUPPLIER
BSU:140/TOPAS

| 1 | NUMBER | PRODUCT CODE (Str) | ATTACHED APPLICATION (Str) | ACCESSORY (Set [1..20] of Str) | BATTERY WORKING TIME (NOMINAL) (hours)(Real) | BATTERY WORKING TIME (MAXIMUM) (hours)(Real) | |
|---|---|---|---|---|---|---|---|
| | 1 | PAG5X14PME | | {AC ADAPTER,...} | 1.7 | | ye |
| | 2 | PA-DB70P5MC | | {AC ADAPTER,...} | 2.2 | | ye |
| | 3 | PA-DS50C1N8L | | | 1.7 | 7.3 | |
| | 4 | PAE5511CME | | {AC ADAPTER,...} | 2.0 | | ye |
| | 5 | PS18070C511A | MicrosoftOfficeXP | {AC ADAPTER,...} | 2.5 | | ye |
| | 6 | PS214K45SL86 | | {AC ADAPTER,...} | 2.0 | | |
| | 7 | PS18080C541B | OfficeXPPersonal | {AC ADAPTER,...} | 2.8 | | |
| | 8 | PAA2580PMC | | {AC ADAPTER,...} | 2.0 | | ye |
| | 9 | PS6001BP5649 | | {AC ADAPTER,...} | 3.0 | | |
| | 10 | PS18095C5418 | | {AC ADAPTER,...} | 2.0 | | |
| | 11 | PA-DB50C2CA | | {AC ADAPTER,...} | 2.0 | 7.3 | |
| | 12 | PP344P501J5B | | | 1.7 | | ye |
| | 13 | PA-SA50C2CD | Office2000Personal | | 1.6 | | |
| | 14 | PAV5410CME | | {BATTERY PACK,...} | 2.7 | | |
| | 15 | PS18080C3412 | | {AC ADAPTER,...} | 2.8 | | |
| | 16 | PP20075P2662 | | | 2.8 | | |

FIG. 9

| TYPE OF INFORMATION | EXTERNAL DATABASE NAME | KIND OF DATABASE | CONNECTION INFORMATION | TABLE | TABLE TYPE |
|---|---|---|---|---|---|
| STOCK DATA | EX_DATABASE 01 | ORACLE | Host_name1, Port_number1, Service_name1, User_name1, Password1, .. | table 01 | HIERARCHICAL TYPE |
| | | | | table 02 | HIERARCHICAL TYPE |
| SELLING PRICE DATA | EX_DATABASE 02 | ORACLE | Host_name2, Port_number2, Service_name2, User_name2, Password2, .. | table 101 | NON-HIERARCHICAL TYPE |

FIG. 10

TB01:NOTEBOOK PC SPEC BY T INC.

- [✓] PRP001:COMMODITY NAME
- [✓] PRP002:MAKER NAME
- [✓] PRP003:PRODUCT CODE
- [✓] PRP004:STANDARD PRICE
- [✓] PRP005:INTERFACE
- [✓] PRP006:CPU
- [ ] PRP007:HDD CAPACITY
- [ ] PRP008:MEMORY CAPACITY
- [ ] PRP009:POINTING DEVICE
- [ ] PRP010:BATTERY PACK TYPE

OK (B14)   CANCEL

FIG. 14

| PRP001 COMMODITY NAME | PRP002 MAKER NAME | PRP003 PRODUCT CODE (KEY) | PRP004 STANDARD PRICE | PRP005 INTERFACE | PRP006 CPU |
|---|---|---|---|---|---|
| Dyna-T1 | T INC. | TR001 | 210000 | USB | P3-1G |
| Dyna-T2 | T INC. | TR002 | 180000 | USB | P3-1G |
| Dyna-T3 | T INC. | TR003 | 190000 | USB | P3-1G |
| M-S1 | S INC. | SR001 | 230000 | PS/2 | P3-1G |
| M-S2 | S INC. | SR002 | 210000 | USB | P3-1G |
| L-M1 | N INC. | NR001 | 220000 | USB | P3-1G |
| F-F1 | F INC. | FR001 | 198000 | PS/2 | P3-2G |

FIG. 15

MACHINE NAME

DATABASE NAME

USER NAME

PASSWORD

TABLE NAME

FIG.21

| DISPLAY | | FIRST TABLE | KEY | SECOND TABLE | DETAIL CONDITION | JOIN TYPE SET |
| --- | --- | --- | --- | --- | --- | --- |
| | | TB01 : NOTEBOOK PC SPEC BY T INC. | | table01 : STOCK TABLE OF NOTEBOOK PC BY T INC. | | B24 |
| ✓ | | PRP001 : COMMODITY NAME | | | | |
| ✓ | | PRP002 : MAKER NAME | | | | |
| ✓ | | PRP003 : PRODUCT CODE | ○ | PRP003 : PRODUCT CODE | ☐ B23 | |
| ✓ | | PRP004 : STANDARD PRICE | | | | |
| | | PRP005 : INTERFACE | | | | |
| | | PRP006 : CPU | | | | |
| | | | | | | |
| | | | | | | |
| ✓ | | | | PRP101 : NUMBER OF STOCKS | | |
| ✓ | | | | PRP102 : NUMBER OF ARRIVAL OF GOODS | | |

B25 · B21—OK   CANCEL—B22

FIG.22

| DISPLAY | FIRST TABLE TB01: NOTEBOOK PC SPEC BY T INC. | KEY | SECOND TABLE table01: STOCK TABLE OF NOTEBOOK PC BY T INC. | DETAIL CONDITION |
|---|---|---|---|---|
| ∟ | PRP001: COMMODITY NAME | | △ | |
| ∟ | PRP002: MAKER NAME | | PRP103: COMMODITY NAME | |
| ∟ | PRP003: PRODUCT CODE | ○ | PR PRP104: WAREHOUSE NAME | □ |
| ∟ | PRP004: STANDARD PRICE | | | |
| | PRP005: INTERFACE | | | |
| | PRP006: CPU | | | |
| | .. | | .. | |
| ∟ | | | PRP101: NUMBER OF STOCKS | |
| ∟ | | | PRP102: NUMBER OF ARRIVAL OF GOODS | |

JOIN TYPE SET

OK    CANCEL

FIG.23

| ID | NAME | FIRST TABLE | SECOND TABLE | JOIN CONDITION | DISPLAY PROPERTY | JOIN TYPE |
|---|---|---|---|---|---|---|
| JOIN CONDITION 001 | STOCK CHECK | CLS003:TB01 | EX_DATABASE01. CLS103:table01 | TB01.PRP003= table 01.PRP003 | TB01.PRP001<br>TB01.PRP002<br>TB01.PRP003<br>table 01.PRP101 | INNER JOIN |
| JOIN CONDITION 002 | ARRIVAL OF GOODS | CLS003:TB01 | EX_DATABASE01. CLS103:table01 | TB01.PRP003= table 01.PRP003 | TB01.PRP001<br>TB01.PRP002<br>TB01.PRP003<br>table 01.PRP102 | INNER JOIN |
| JOIN CONDITION 101 | CONFIRMATION OF SELLING PRICE | CLS003:TB01 | EX_DATABASE02. table101 | TB01.PRP003= table 101.PRODUCT CODE | TB01.PRP001<br>table 101.PRODUCT NAME<br>table 101.SELLING PRICE | INNER JOIN |
| JOIN CONDITION 003 | TEMPLATE OF STOCKS CHECK | CLS002:TB10 | EX_DATABASE01. CLS102:table00 | TB10.PRP003= table 00.PRODUCT CODE | TB10.PRP003<br>table 00.PRP101 | INNER JOIN |

FIG.25

CONTENTS DATA OF MOUSE

| MAKER NAME | PRODUCT NAME | PRODUCT CODE (KEY) | INTERFACE |
|---|---|---|---|
| T INC. | MOUSE001 | MR001 | USB |
| T INC. | MOUSE002 | MR002 | USB |
| T INC. | MOUSE003 | MR003 | USB |
| T INC. | MOUSE004 | MR004 | PS/2 |
| T INC. | MOUSE005 | MR005 | PS/2 |
| T INC. | M001 | MIR001 | PS/2 |
| T INC. | M002 | MIR002 | USB |

FIG.27

CONTENTS DATA OF NOTEBOOK PC

| MAKER NAME | PRODUCT CODE (KEY) | RECOMMENDABLE MOUSE PRODUCT CODE | MOUSE INTERFACE |
|---|---|---|---|
| T INC. | Dyna100 | MR001 | USB |
| T INC. | Dyna101 | MR001 | USB |
| T INC. | Dyna102 | MR002 | USB |
| T INC. | Dyna103 | MR002 | USB |
| T INC. | Dyna104 | MR004 | USB |
| T INC. | Dyna9999 | MIR001 | PS/2 |
| T INC. | Dyna10000 | MIR002 | PS/2 |

| PRP001 | PRP002 | PRP003 | PRP004 | PRP005 | PRP006 | PRP007 | PRP008 |
|---|---|---|---|---|---|---|---|
| COMMODITY NAME | MAKER NAME | PRODUCT CODE (KEY) | STANDARD PRICE | INTERFACE | CPU | STANDARD MEMORY | HDD CAPACITY |

| PRP001 | PRP002 | PRP003 | PRP004 | PRP005 | PRP006 | PRP007 | PRP008 | PRP011 |
|---|---|---|---|---|---|---|---|---|
| COMMODITY NAME | MAKER NAME | PRODUCT CODE (KEY) | STANDARD PRICE | INTERFACE | CPU | STANDARD MEMORY | HDD CAPACITY | DISPLAY |
| EQ001 | T INC. | TR100 | 300000 | USB | P3-1G | 512MB | 60G | CRT |
| EQ002 | T INC. | TR101 | 320000 | USB | P3-1.3G | 512MB | 50G | CRT |

FIG.30 table00

| PRP003 PRODUCT CODE (KEY) | PRP101 NUMBER OF STOCKS | PRP102 NUMBER OF ARRIVAL OF GOODS | PRP103 COMMODITY NAME | PRP104 WAREHOUSE NUMBER |
|---|---|---|---|---|

FIG.31 table02

| PRP003 PRODUCT CODE (KEY) | PRP101 NUMBER OF STOCKS | PRP102 NUMBER OF ARRIVAL OF GOODS | PRP103 COMMODITY NAME | PRP104 WAREHOUSE NUMBER |
|---|---|---|---|---|
| TR100 | 12 | 10 | EQ001 | 4TH WAREHOUSE |
| TR101 | 10 | 22 | EQ002 | 1ST WAREHOUSE |

FIG.32

DATA PROCESSING APPARATUS AND METHOD

CROSS-REFERENCE TO RELATED APPLICATIONS

This application is based upon and claims the benefit of priority from prior Japanese Patent Application P2003-203063, filed on Jul. 29, 2003; the entire contents of which are incorporated herein by reference.

FIELD OF THE INVENTION

The present invention relates to a data processing apparatus and a method for joining a table of contents data stored in a hierarchical database and a table of record data.

BACKGROUND OF THE INVENTION

In some databases, a lower level class inherits properties from an upper level class, such as in Object-Oriented Databases (OODB) and Object-Relational Database (ORDB). The function wherein a property of the upper level class is inherited to the lower level class is called "inheritance". For example, inheritance is disclosed in "Object-Oriented Concepts, Databases, and Applications, Edited by Won Kim, 1989, ACM Press".

In references disclosing the Object-Oriented Database, classification in hierarchical structure is called "class". On the other hand, in the Object-Relational Database, a table of which property is inheritable corresponds to a class. In a plurality of tables having hierarchical structure, a property is inherited from an upper level table to a lower level table. Briefly, header information of column comprising the upper level table is inherited to the lower level table. In this case, both databases are called "hierarchical database". A value of the same property belonging to each hierarchical class is called "instance" or "contents data", and a set of the data is called "population".

In Internet, as international standard to package an electronic catalogue system providing product information, ISO13584 (Parts Library) is well known. This is one of the hierarchical databases. In ISO13584, an electronic catalogue is comprised of schema and contents. By providing data structure unifying the schema and contents, common use and reuse of product information can be realized.

In the schema defined in ISO13584, product classification is hierarchically represented by single tree structure of "product class". Each "product class" has "property item", and "property item" of some "product class" is inherited to "product class" of lower level. Furthermore, in order to uniquely specify "product class" and "property item", a unique ID called "BSU code" is respectively assigned. On the other hand, the contents are represented as a table in which a property value peculiar to each product is embedded in property item defined in the schema.

While ISO13584 provides a framework as the electronic catalogue, international standardization of actual schema is progressed. In IEC61360, an upper level hierarchical part of schema in electric/electronic area, i.e., a general part of "product class" and "property item", are progressed. By using the standardization, product catalogue creator of each company can determine original detail "product class" and "property item" as lower level expansion from IEC61360, and create its own contents. By utilizing the contents, a user of the electronic catalogue can trace a class hierarchy of "product class", restrict to a product necessary for the user by referring to the property value, and retrieve the desired product. Recently, in response to this standardization, several systems based on ISO13584 are developed.

In Relational database or ORDB, a join operation (JOIN) as one operation between tables is prepared. In the hierarchical database, this operation can be executed. In general, the join operation (JOIN) is simple, but time consuming because of occurrence of loop of "(the number of rows)×(the number of rows)". Accordingly, in order to provide the join operation (JOIN) to a user in a Web type database system, the number of operations can not be controlled. In other words, the join operation (JOIN) having a large number of operations and a large system load often occurs.

As mentioned-above, in the hierarchical database having a hierarchical structure of a plurality of classes, when joining a contents data table registered in a class of the hierarchical structure with a table stored in the same or another table, the number of operations can not be controlled. Accordingly, a join operation (JOIN) of large system load occurs.

SUMMARY OF THE INVENTION

The present invention is directed to a data processing apparatus and a method for effectively controlling the processing of join operations between a table of contents data stored in a hierarchical database and another table of record data.

According to an aspect of the present invention, there is provided an apparatus for processing data, comprising: a database configured to hierarchically store a plurality of classes and a plurality of contents data corresponding to each of the plurality of classes, each class having inheritably a plurality of properties from upper level class, each contents data having a value of each of the plurality of properties; a display unit to divide the plurality of contents data of one class selected from the plurality of classes into a plurality of groups, and to display a first table of contents data of one group selected from the plurality of groups; a memory to store a second table of a plurality of record data, each record data having a value of each of a plurality of items; an indication unit configured to select a first property from the plurality of properties of the one class, and to select a first item from the plurality of items; and a generation unit configured to join contents data of the first table with record data of the second table on condition that a value of the first property of the contents data is equal to a value of the first item of the record data, and to generate a third table of a plurality of joined data, each joined data having a value of each of the plurality of properties of the one class and a value of each of the plurality of items.

According to another aspect of the present invention, there is also provided a method for processing data, comprising: acquiring a hierarchical structure of a plurality of classes and a plurality of contents data corresponding to each of the plurality of classes from a database, each class having inheritably a plurality of properties from upper level class, each contents data having a value of each of the plurality of properties; dividing the plurality of contents data of one class selected from the plurality of classes into a plurality of groups; displaying a first table of contents data of one group selected from the plurality of groups; acquiring a second table of a plurality of record data from a memory, each record data having a value of each of a plurality of items; selecting a first property from the plurality of properties of the one class; selecting a first item from the plurality of items; joining contents data of the first table with record data of the second table on condition that a value of the first property of the contents data is equal to a value of the first item of the record data; and generating a third table of a plurality of joined data, each joined data having a value of each of the plurality of properties of the one class and a value of each of the plurality of items.

According to still another aspect of the present invention, there is also provided a computer program product, comprising: a computer readable program code embodied in said product for causing a computer to process data, said computer readable program code comprising: a first program code to acquire a hierarchical structure of a plurality of classes and a plurality of contents data corresponding to each of the plurality of classes from a database, each class having inheritably a plurality of properties from upper level class, each contents data having a value of each of the plurality of properties; a second program code to divide the plurality of contents data of one class selected from the plurality of classes into a plurality of groups; a third program code to display a first table of contents data of one group selected from the plurality of groups; a fourth program code to acquire a second table of a plurality of record data from a memory, each record data having a value of each of a plurality of items; a fifth program code to select a first property from the plurality of properties of the one class; a sixth program code to select a first item from the plurality of items; a seventh program code to join contents data of the first table with record data of the second table on condition that a value of the first property of the contents data is equal to a value of the first item of the record data; and an eighth program code to generate a third table of a plurality of joined data, each joined data having a value of each of the plurality of properties of the one class and a value of each of the plurality of items.

BRIEF DESCRIPTION OF THE DRAWINGS

FIG. 3 is a concrete example of contents data registered in the hierarchical database.

FIG. 5 is a concrete example of contents data registered in the first external database of FIG. 4.

FIG. 6 is one example of a table registered in a second external database.

FIGS. 7A, 7B, 7C, 7D and 7E are schematic diagrams to explain processing of joint operation.

FIG. 8 is a display example of a table of contents data.

FIG. 9 is a display example of another table of joined data.

FIG. 10 is one example of information stored in an external DB connection information memory.

FIG. 14 is one example of a screen to select a user's desired property from a plurality of properties of indicated internal data.

FIG. 15 is a display example of a table of the indicated internal data.

FIG. 21 is one example of a screen to input information of external data.

FIG. 22 is one example of a screen to input a join condition.

FIG. 23 is another example of a screen to input a join condition.

FIG. 25 is one example of join condition stored in a past join operation memory.

FIG. 27 is one example of contents data of mouse in a table of join operation object.

FIG. 28 is one example of contents data of notebook PC in a table of join operation object.

FIG. 29 is one example of a table "TB10" registered in "PC main body" node of FIG. 2.

FIG. 30 is one example of a table "TB11" registered in "desktop PC" node of FIG. 2.

FIG. 31 is one example of a table "table 00" registered in "stocks of PC main body" node of FIG. 4.

FIG. 32 is one example of a table "table 02" registered in "stocks of desktop PC" node of FIG. 4.

DETAILED DESCRIPTION OF THE EMBODIMENTS

Figure 1:
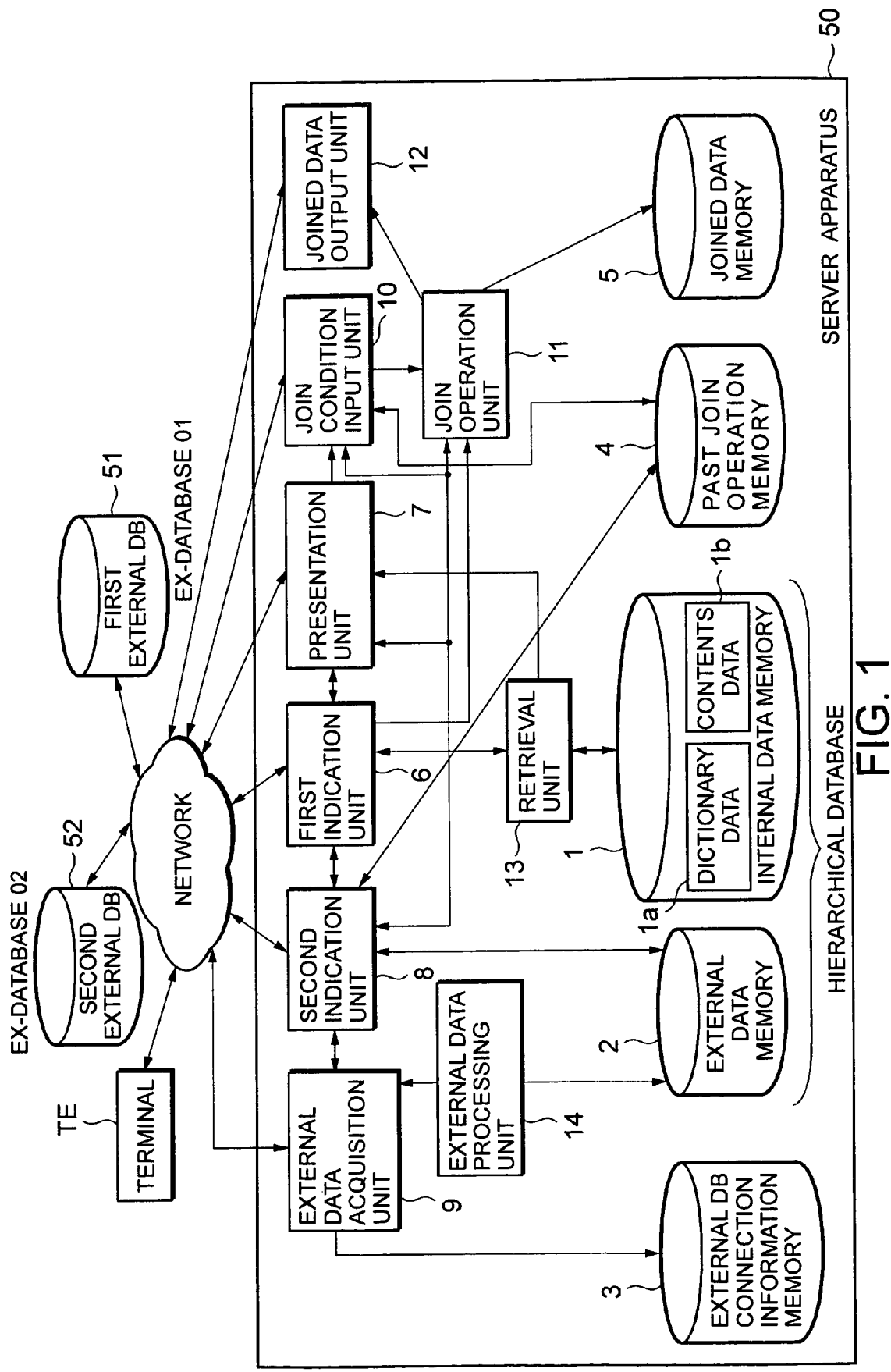
FIG. 1 is a block diagram of a data processing apparatus according to the present invention.

Hereinafter, various embodiments of the present invention will be explained by referring to the drawings.

First Embodiment

FIG. 1 is an overall block diagram of a system according to the present embodiment. The system includes a server apparatus 50 storing data such as a product specification or spec in an internal data memory 1, a plurality of databases (such as a first external database 51 and a second external database 52) connected to the server apparatus 50 by a network, and a user terminal TE.

The first external DB 51 and the second external DB 52 store stock information and selling price information and so on of each product which is frequently updated. This information is independently controlled from data (internal data) of the internal data memory 1 because the stock information and the selling price information are frequently updated differently from the product spec. An identifier (ID) of the first external DB 51 is "ex_database01", and an identifier (ID) of the second external DB 52 is "ex_database02".

Data (external data) stored in the first external DB 51 and the second external DB 52 is acquired by an external data acquisition unit 9 of the server apparatus 50. An external data processing unit 14 assigns a class to dictionary data of external data. If the external data have a hierarchical structure in the same way as the internal data, a corresponding class is assigned to each item comprising the hierarchical structure. If the external data have a table format, the corresponding class is assigned to the table. Furthermore, the external data processing unit 14 assigns a unique property identifier such as BSU to each item (or property) in the external data, decides a data type of a value (or a property value) of each item, and stores the decision result in an external data memory 2 of the server apparatus 50.

The internal data memory 1 and the external data memory 2 comprise a hierarchical database. The hierarchical database has a structure in which a plurality of classes is hierarchically related. Each class has a property of an upper level class of the class. Contents data of the property included in the class is registered to the class.

Hierarchical information among classes comprising the hierarchical structure is called schema data. The schema data and property of each class are dictionary data.

The internal data memory 1 is comprised of a dictionary data memory 1*a* storing the dictionary data, and a contents data memory 1*b* storing the contents data. In the contents data memory 1*b*, contents data of a property included in a class is stored in correspondence with the class stored in the dictionary data memory 1*a*. One contents datum comprised of each value of a plurality of properties stored in the contents data memory 1*b* is called "record data".

Figure 2:
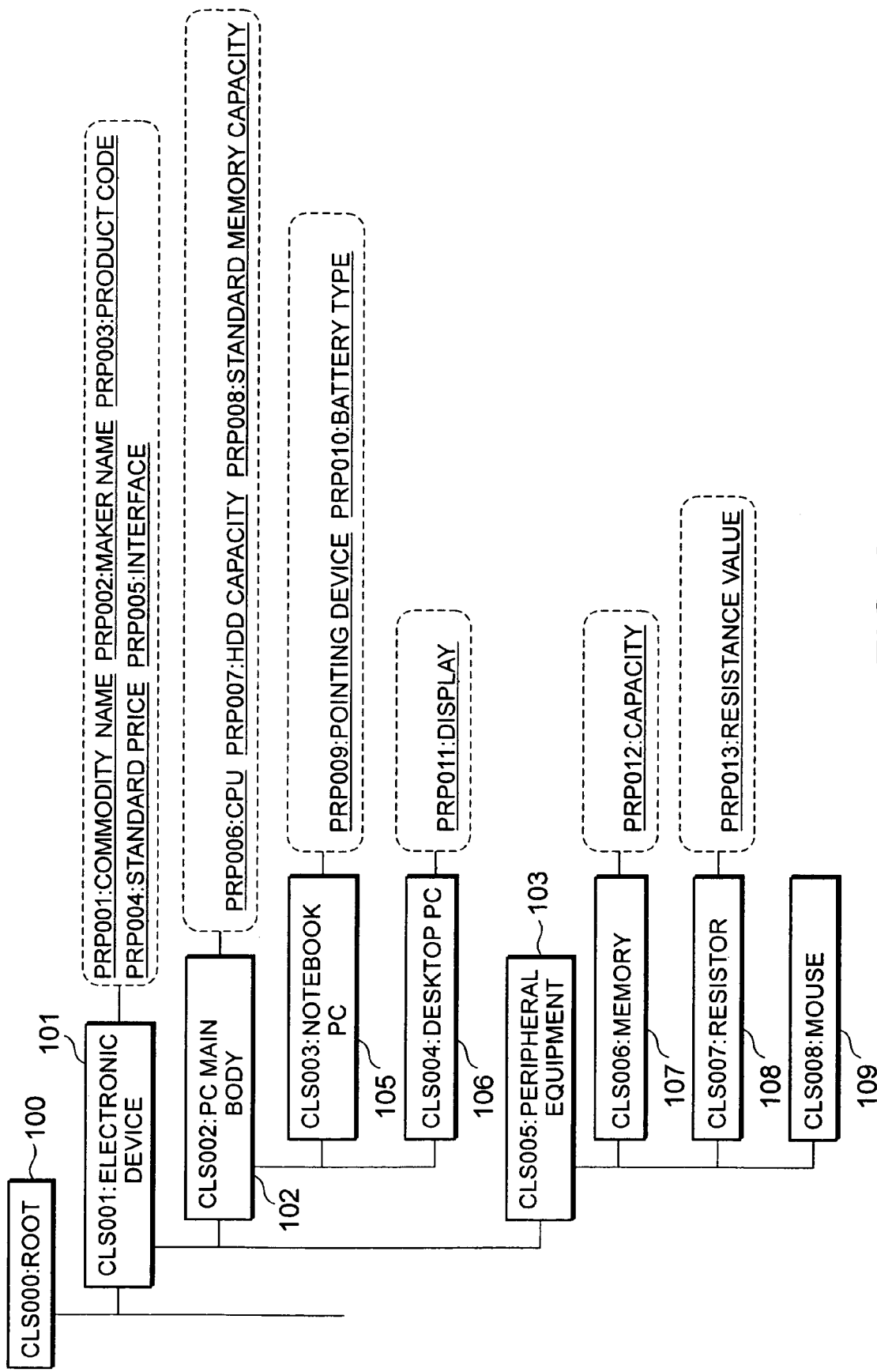
FIG. 2 is a schematic diagram of hierarchical structure of a hierarchical database stored in an internal data memory 1.

FIG. 2 is a hierarchical structure of the hierarchical database stored in the internal data memory 1. As shown in the hierarchical database of FIG. 2, "root" node 100 is a root node, and a lower node such as node 101 of class "electronic device" is related to the root node 100. In "electronic device" node 101, a node 102 of class "PC main body" and a node 103 of class "peripheral equipment" are related as a lower node. In "PC main body" node 102, a node 105 of class "notebook PC" and a node 106 of class "desktop PC" are related as a lower node. In "peripheral equipment" node 103, nodes 107~109 of classes "memory", "register" and "mouse" are related.

Briefly, a class "electronic device" is subdivided into two classes "PC main body" and "peripheral equipment". "PC main body" is subdivided into two classes "notebook PC" and "desktop PC". "Peripheral equipment" is subdivided into three classes "memory", "register" and "mouse".

In each class hierarchically related, a property peculiar to each class (a part surrounded by a dotted line) is determined. Each class inherits a property of an upper level class of each class in the hierarchical structure. For example, a property of "notebook PC" node 105 inherits a property of "electronic device" node 101 and a property of "PC main body" node 102 in addition to the property peculiar to the node 105. Concretely, "notebook PC" node 105 has properties ("commodity name", "maker name", "product code", "standard price", "interface") of "electronic device" node 101, properties ("CPU", "HDD capacity", "standard memory capacity") of "PC main body" node 102, and properties ("pointing device", "battery type") of "notebook PC" node 105.

This data model is similar to that disclosed in ISO13584/Parts Library (PLIB) as international standard of exchange format of device library. In PLIB, as code to discriminate each class and property, BSU code (property identifier) guaranteed as a unique code in the world is used different from a name. In this specification, in order to simplify the explanation, a name is often used as a class identifier and a property identifier. However, this limitation does not prevent from applying the present invention to PLIB.

In each class of FIG. 2, contents data consisted of a value of each property (a property peculiar to a class and a property inherited from an upper level class of the class) of the class is registered.

FIG. 3 is a concrete example of contents data registered in the hierarchical database of FIG. 2. In FIG. 3, a table "TB01" of contents data registered in a node 105 of class "notebook PC" is shown. Record data registered in class "notebook PC" is comprised of each value corresponding to properties ("commodity name", "maker name", "product code", "standard price", "interface") of "electronic device" node 101, properties ("CPU", "HDD capacity", "standard memory capacity") of "PC main body" node 102, and properties ("pointing device", "battery type") of "notebook PC" node 105.

Figure 4:
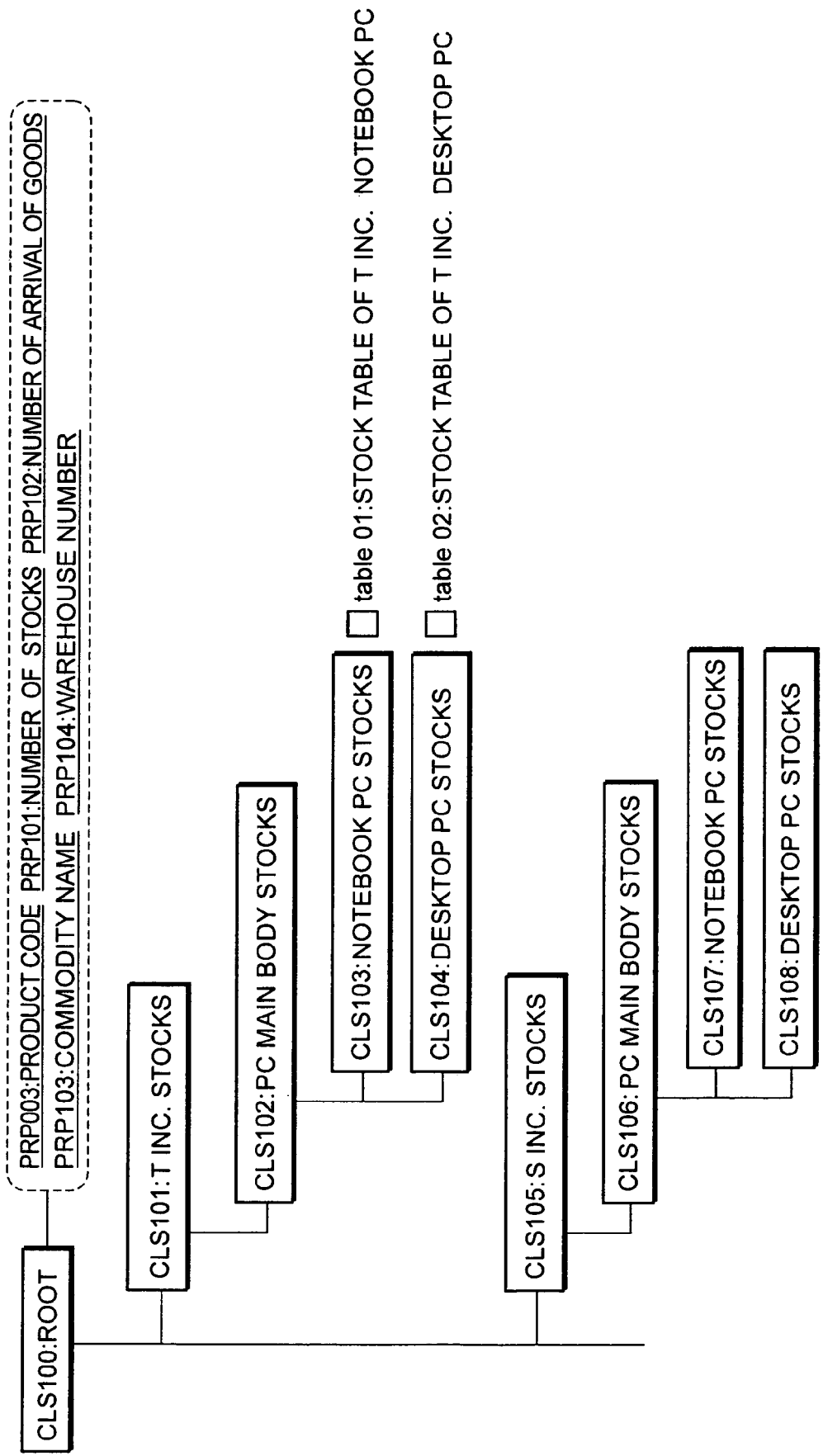
FIG. 4 is a schematic diagram of a hierarchical structure stored in a first external database.

The first external DB 51 is a hierarchical database, and mainly stores the number of stocks of each product. FIG. 4 is an example of a part of hierarchical structure of hierarchical database comprised in the first external DB 51. In the hierarchical database of FIG. 4, "root" node is regarded as a root node. In this root node, nodes of two classes "T INC. stocks" and "S INC. stocks" are related as a lower node. In "T INC. stocks" node, a node of class "PC main body stocks" is related as a lower node. In "PC main body stocks" node, nodes of two classes "notebook PC stocks" and "desktop PC stocks" are related as lower nodes.

In each class of FIG. 4, contents data comprised of a value of each property (a property peculiar to the class and a property inherited from the upper level class) of the class is registered.

FIG. 5 is a concrete example of contents data registered in the hierarchical database of FIG. 4. In FIG. 5, a table "table 01" of contents data registered in class "notebook PC stocks" (CLS103) is shown. Record data registered in the class "notebook PC stocks" (CLS 103) is comprised of a value corresponding to each property ("product code", "number of stocks", "number of arrival of goods") of a class "ROOT" in FIG. 4.

The second external DB 52 is a relational database (RDB) to mainly store a selling price of each product. FIG. 6 is one example of a table registered in the second external DB 52. In the table (table 101) of FIG. 6, a plurality of record data each comprised of a value of each item ("commodity name", "product code", "selling price") is registered.

A function of the system of the present embodiment is explained by referring to FIGS. 7A~7E. FIG. 7A is an example of a table of product spec of contents data which is read from the internal data memory 1 and selected as processing object by a user.

First, if the user wants to know stock status of a product shown in FIG. 7A, the user indicates contents data (table of stocks) stored in the first external DB 51 shown in FIG. 7B. In this case, the system joins the table of product spec of FIG. 7A with the table of stocks of FIG. 7B, and provides the join operation result to the user. As a join condition used for this join operation, the user indicates the same item in each item of the table of product spec and the table of stocks. Concretely, the user indicates the join condition that a part number in the table of product spec of FIG. 7A is the same as a part number in the table of stocks of FIG. 7B (This join condition is represented as "Table of product spec. Part number=Table of stocks. Part number".). FIG. 7D is a join operation result of the table of product spec and the table of stocks by using this join condition. In record data of the table of product spec and record data of the table of stocks, two record data including the same value corresponding to the item "part number" are joined. In this case, the part numbers "K12345" and "A22222" are included in both tables. Accordingly, two record data each including the part number "K12345" in FIGS. 7A and 7B are joined, and two record data each including the part number "A22222" in FIGS. 7A and 7B are joined. As a result, a table of join operation result is generated as shown in FIG. 7D.

Furthermore, if the user wants to know a selling price of the product shown in FIG. 7A, the user indicates a table of selling price stored in the second external DB 52 shown in FIG. 7C. In this case, the system joins the table of product spec of FIG. 7A with the table of selling price of FIG. 7C, and provides the join operation result to the user. As a join condition used for this join operation, the user indicates the same item in items of the table of product speck and items of the table of selling price. In this case, the join condition is represented as "Table of product spec. part number=Table of selling price. part number". The join result of the table of product spec and the table of selling price by using this join condition is shown in FIG. 7E. In values of "part number" of the table of product spec and the table of selling price, the values "K12345" and "DDFE002" are included in both tables. Accordingly, two record data each including the part number "K12345" in FIGS. 7A and 7C are joined, and two record data each including the part number "DDFE002" in FIGS. 7A and 7C are joined. As a result, a table of join operation result is generated as shown in FIG. 7E.

The number of contents data registered in each class of the internal data memory 1 of this system is, for example, in electronic device area, thousands or tens of thousands. Briefly, assume that the user indicates a class "notebook PC" in the hierarchical database of FIG. 2 from the user terminal TE. In this case, if all contents data of the table TB01 registered in this class are distributed to the user terminal TE, it takes a long time to send the contents data because of a large data quantity. Furthermore, if a join operation is executed between a table of all contents data and a table stored in the first or second external DB, control of the number of operations is important. Accordingly, in this system, the contents data registered in the user's indicated class are divided into a plurality of groups each including contents data of predetermined number, and contents data of each group is presented to the user in order. When the user requests a join operation for a group or contents data limited from the group, the join operation is executed. Briefly, before executing the join operation, the number of contents data as join operation object is limited (the number of data is reduced as the minimum of necessity).

From a viewpoint of the user side, the user's request that the number of stocks or a selling price is necessary for all contents data registered in some class is few. It is sufficient that the number of stocks or the selling price is presented for the user's desired contents data only.

In a table TB01 registered in a class of the hierarchical database, display order is uniformly guaranteed different from a relational database. Accordingly, for example, if contents data of which number is above three hundred are registered in class "notebook PC" of the hierarchical database of FIG. 2, the contents data are divided into a plurality of groups, and each number of contents data is one hundred. A table of one hundred of the first group is sent to the user terminal TE. FIG. 8 is a display example of the table of contents data on the user terminal TE. In FIG. 8, the contents data of one hundred first sent from the server apparatus 50 is displayed.

In FIG. 8, by selecting a button 201, a table of contents data of the next one hundred is sent from the server apparatus 50 to the user terminal TE, and displayed on the user terminal TE.

If the user requests contents data stored in the internal data memory 1, in addition to indication of class, the user indicates a property value or the user's desired keyword as a retrieval condition. In this case, the user can select contents data matched with the retrieval condition from contents data registered in the indicated class. If the selected contents data are presented to the user, the selected contents data are divided into a plurality of groups each including contents data of a predetermined number (For example, one hundred), and the contents data of each group is presented in order.

In this way, in contents data registered in some class, a table of contents data in the group presented to the user is regarded as a processing object of join operation by the join operation unit 11. Furthermore, in the contents data of the group presented to the user, if the user selects a part of the contents data as shown in FIG. 9, the selected contents data is regarded as a processing object of a join operation. In the case of a join operation, limitation of the number of contents data as join operation object is very important because the number of operation steps is few in comparison with a join operation of contents data without limitation of the number of the contents data.

In FIG. 1, in response to a request from the user terminal TE, the server apparatus 50 reads a product spec from the internal data memory 1, and provides it to the user terminal TE.

In addition to the internal data memory 1, the server apparatus 50 includes an external data memory 2, an external DB connection information memory 3, a part join operation memory 4, a joined data memory 5, a first indication unit 6, a presentation unit 7, a second indication unit 8, an external data acquisition unit 9, a join condition input unit 10, a join operation unit 11, a joined data output unit 12, a retrieval unit 13, and an external data processing unit 14.

As used herein, those skilled in the art will understand that the term "unit" is broadly defined as a processing device (such as a server, a computer, a microprocessor, a microcontroller, a specifically programmed logic circuit, an application specific integrated circuit, a discrete circuit, etc.) that provides the described communication and the functional desired communication. While such a hardware-based implementation is clearly described and contemplated, those skilled in the art will quickly recognize that a "unit" may alternatively be implemented as a software module that works in combination with such a processing device.

Depending on the implementation constraints, a software module or a processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

Hereinafter, each component unit of the server apparatus in FIG. 1 is explained by referring to a flow chart shown in FIG. 11.

First, at step S1, the first indication unit 6 indicates internal data stored in the internal data memory 1. The first indication unit 6 indicates the contents data of the user's desired class in data stored in the internal data memory 1 and inputs a retrieval condition of a table of the desired contents data from the internal data memory 1. As the retrieval condition, the user's desired class, a property value, and a keyword, are used.

The retrieval unit 13 retrieves contents data from the internal data memory 1 based on the retrieval condition input from the first indication unit 6. For example, by retrieving a class matched with the retrieval condition, contents data (For example, a table format) registered in the class are read out and provided to the presentation unit 7.

The presentation unit 7 presents the contents data retrieved by the retrieval unit 13 to the user by unit of group including contents data of predetermined number (For example, one hundred). A table of contents data included in the group presented to the user at the present is regarded as object of join operation of the join operation unit 11.

Next, as step S2, the second indication unit 8 indicates external data. The second indication unit 8 is a unit to indicate data (For example a table format) stored in an external database such as the first external DB 51 and the second external DB 52. The user indicates external data related to contents data presented by the presentation unit 7.

The external DB connection information memory 3 stores connection information such as URL which is necessary for the external data acquisition unit 9 to connect to the external database such as the first external DB 51 and the second external DB 52. In the external DB connection information memory 3, as shown in FIG. 10, as for the first external DB 51 and the second external DB 52, a type of information, an identifier (name) of external DB, kind of database, and connection information (For example, IP, a host name, a port number, a table name for join operation in the database as connection destination), are stored as a table format.

The external data acquisition unit 9 connects the external database through a network by referring to a table stored in the external DB connection information memory 3 shown in FIG. 10, and acquires dictionary data of the external data. The dictionary data of the external data acquired by the external data acquisition unit 9 is stored in the external data memory 2. If dictionary data of external data indicated by the second indication unit 8 is already stored in the external data memory 2, the external database is not accessed except for the case that reacquisition is necessary such as occurrence of schema change of external DB. The dictionary data of external data includes a table name from the external DB, a property name, a data type, and key information comprising the table. If the external DB is a hierarchical database, the dictionary data further includes a hierarchical relationship, a class name, a class identifier, a property identifier and a table identifier.

The external data memory 2 is a hierarchical database to store the external data. When the external data is stored in the external data memory 2, the external data processing unit 14 assigns a class to dictionary data of the external data, assigns a unique identifier of property such as BSU to each item (or property) in the external data, and decides a data type of a value (or a property value) of each item. The second indication unit 8 reads the indicated external data from the external data memory 2, and provides the read external data to the join condition input unit 10.

Figure 18:
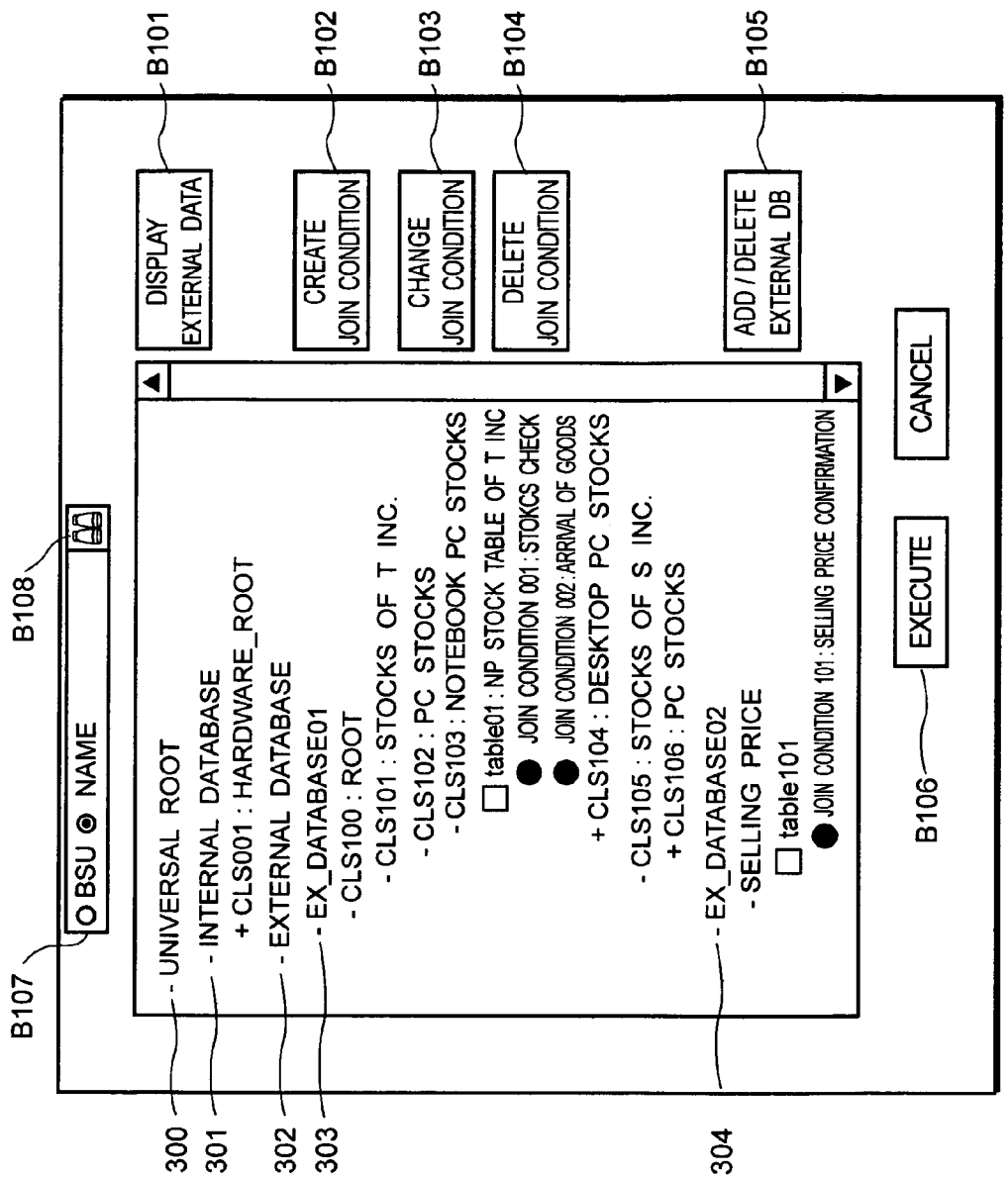
FIG. 18 is one example of a screen to indicate external data.

Next, at step S3, a join condition to join a table (It is called a first table) of internal data presented by the presentation unit 7 with a table (It is called a second table) of external data indicated by the second indication unit 8 is set. The join condition input unit 10 makes a display of the server apparatus 50 or the user terminal TE display a join condition input screen in order to input a join condition to join the above-mentioned two tables. Accordingly, each item (or property) in the second table and each property in the first table are displayed. Furthermore, by comparing each item name (or each property name) in the second table with each property name in the first table, both names are correspondingly displayed on the display of the server apparatus 50 or the user terminal TE in the case of coincidence. Furthermore, a table of internal data and a table of external data joined using the join condition input by the join condition input unit 10, and past join operation information (join history) including the join condition used for joining both tables, are stored in the past join operation memory 4. At step S4, when an indication of join execution is input (For example, when a button B106 "EXECUTE" in FIG. 18 is selected by a user), the first table including a predetermined number of contents data (as a processing object of join operation presented by the presentation unit at the present) and the second table including the external data indicated by the second indication unit 8 are joined using the join condition input by the join condition input unit 10.

The join operation unit 11 executes a join operation between the first table and the second table based on the join condition input by the join condition input unit 10. This join operation is the same as a join operation often used in a relational database.

Figure 11:
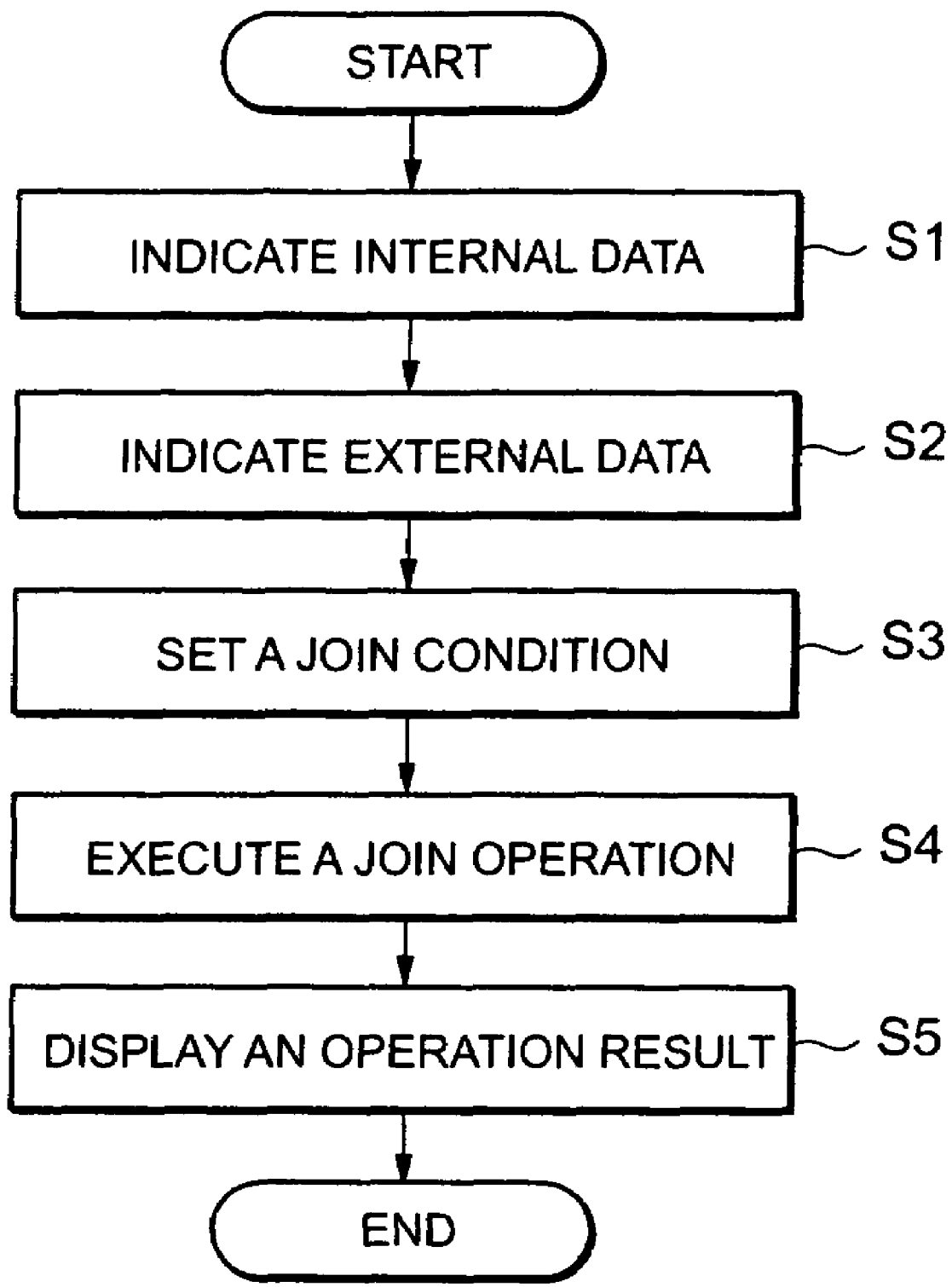
FIG. 11 is a flowchart of a data processing method according to a first embodiment of the present invention.
Figure 12:
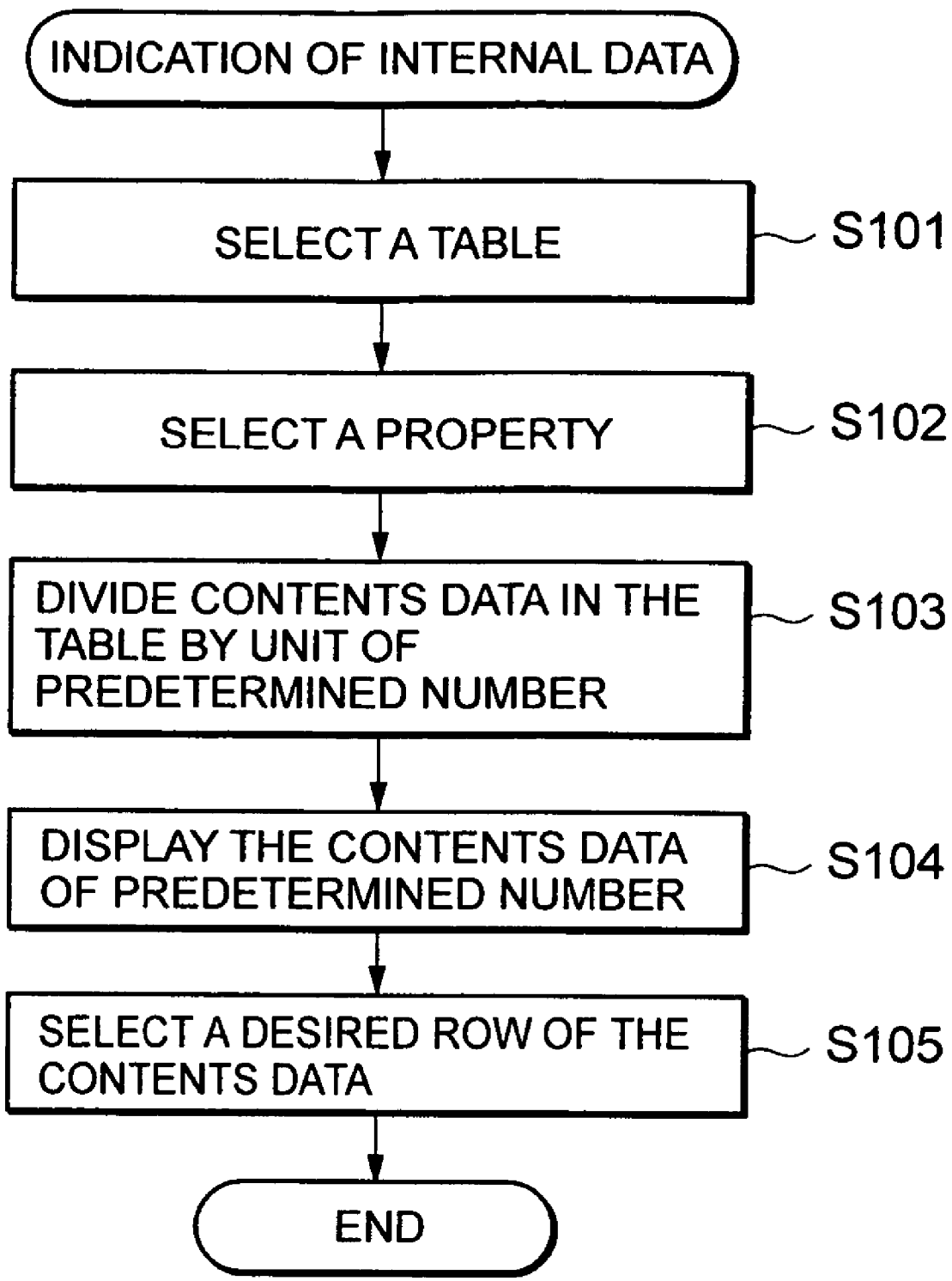
FIG. 12 is a flowchart of processing of indication of internal data in FIG. 11.
Figure 13:
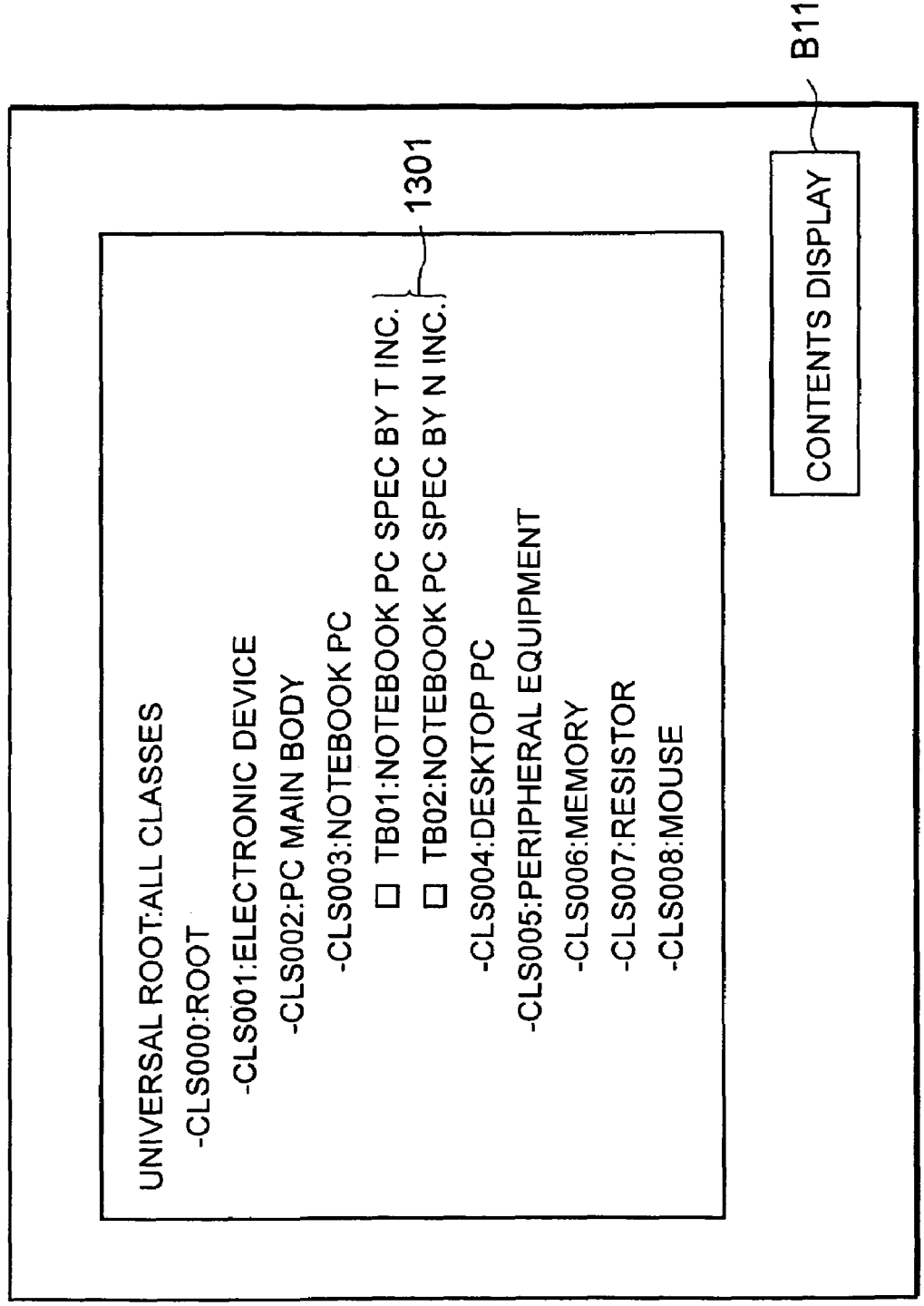
FIG. 13 is one example of a screen to indicate internal data.

Next, the processing of step S1 in FIG. 11 is explained in detail by referring to a flowchart in FIG. 12. For example, as shown in FIG. 13, the first indication unit 6 displays a tree of hierarchical structures stored in the internal data memory 1 on a display of the server apparatus 50 or the user terminal TE. In FIG. 13, by selecting a class "notebook PC" from the tree, a table name 1301 of contents data registered in the class is displayed. When a user selects his/her desired table (For example, TB10) from the table name 1301 (For example, check is input on a check box) and selects a button B11 "CONTENTS DISPLAY" (step S101), the retrieval unit 13 retrieves a selectable property from properties included in the selected table from the internal data memory 1. For example, the presentation unit 7 displays a list of selectable properties as shown in FIG. 14. The user selects his/her desired property from the list of FIG. 14 (step S102). In this example of FIG. 14, in properties of contents data registered in table TB01, a property of which check box includes an input of check represents the user's selected property. Next, when the user selects a button B14 "OK" on the list of the screen, the retrieval unit 13 retrieves contents data of the property (selected at step S102) on the table TB01 from the internal data memory 1, and provides the presentation unit 7 with the contents data as shown in FIG. 15. The presentation unit 7 divides the contents data of the table (shown in FIG. 15) into a plurality of groups each of which number of contents data is below a predetermined number (For example, one hundred) (step S103), and displays a table of contents data including a first group as shown in FIG. 8 (step S104). This presented table of contents data (The first table) is regarded as a processing object of a join operation. Furthermore, if necessary, the user selects a part (row) of the contents data of the first table as shown in FIG. 9. In this case, the user's selected contents data are regarded as the processing object of a join operation.

Figure 16:
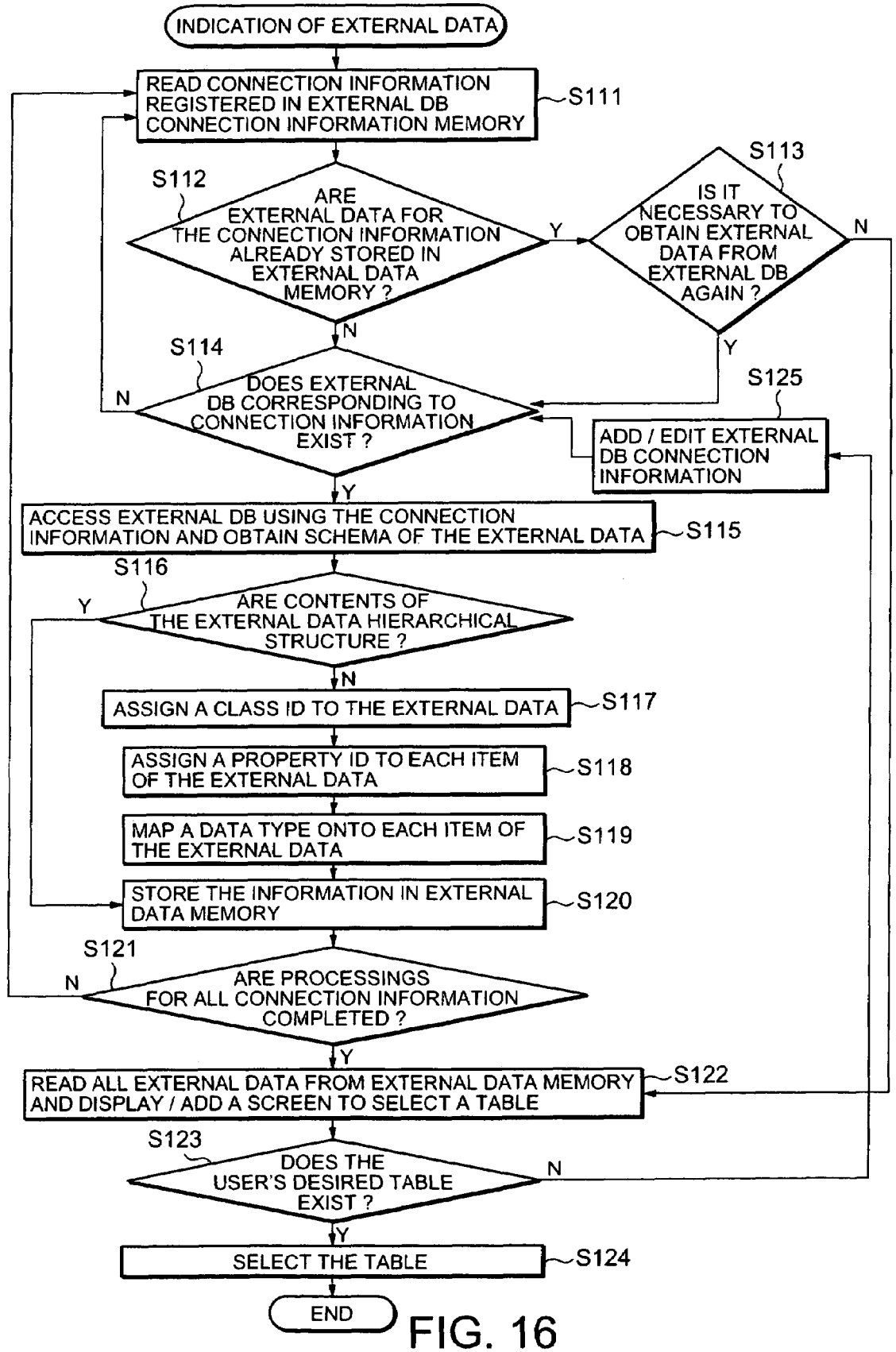
FIG. 16 is a flowchart of processing of indication of external data.

Next, the processing of step S2 in FIG. 11 is explained in detail by referring to a flowchart in FIG. 16. When the user selects a button B1 "EXECUTE JOIN OPERATION" on a screen of contents data of the first table shown in FIG. 9, the first indication unit 6 reads the dictionary data of internal data stored in the internal data memory 1 of the system, and the second indication unit 8 reads the external data stored in the external data memory 2. As shown in FIG. 18, hierarchical classes and contents data are displayed. In FIG. 18, a radio button B107 is a button to select whether a class is displayed by an identifier (BSU) or a name. Furthermore, by calling a screen to retrieve a class, a contents data name (table name) or a join condition name, a button B108 to help the user's table selection or join condition selection may be set as shown in FIG. 18. Furthermore, in addition to display of internal data in the tree, display/non-display may be changed by a button B101.

Figure 19:
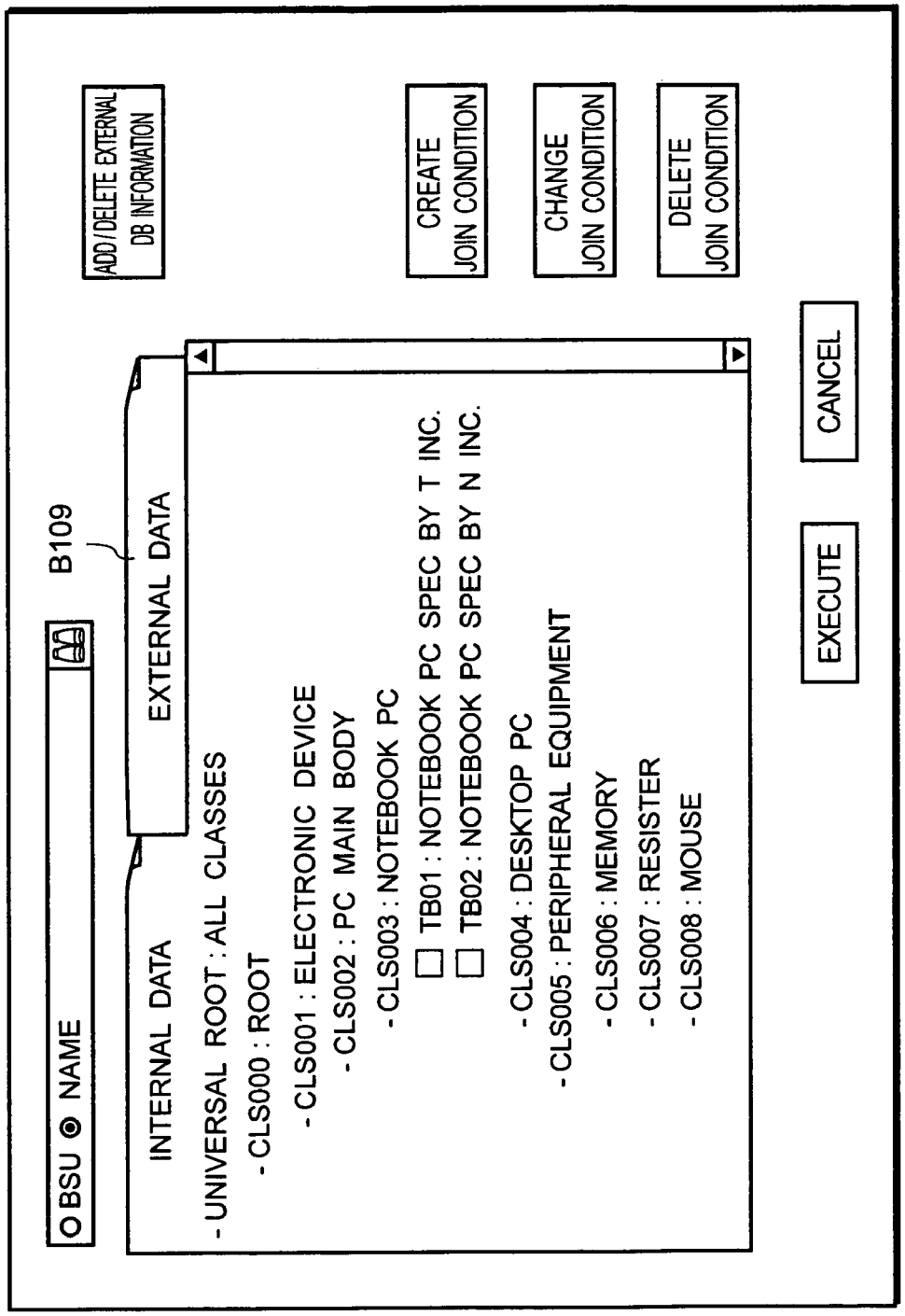
FIG. 19 is one example of a screen to indicate internal data.
Figure 20:
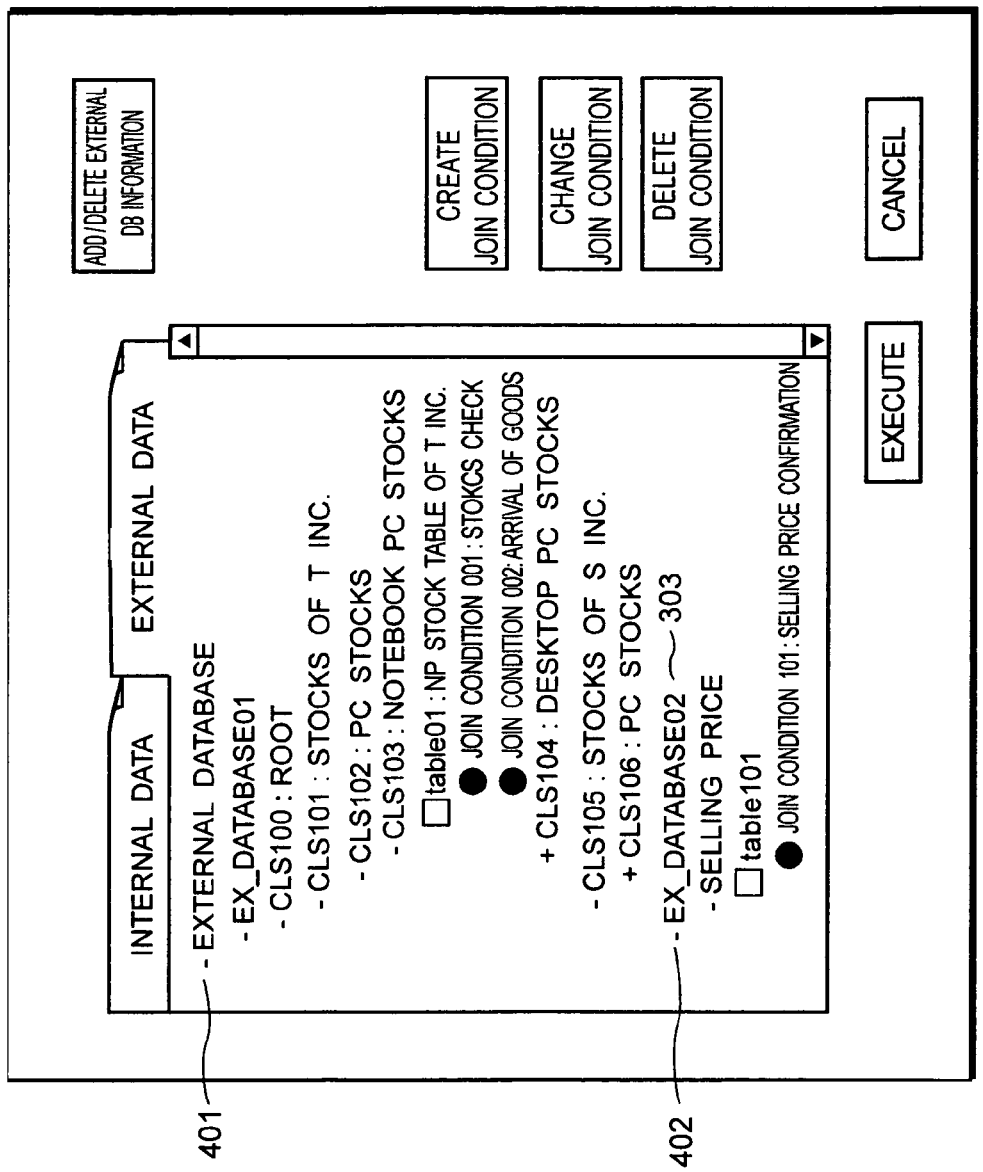
FIG. 20 is another example of a screen to indicate external data.

FIGS. 19 and 20 are display examples of data of join operation object by separating two trees of internal data and external data. FIG. 19 represents a status that a tub "INTERNAL DATA" is selected and a tree of the internal data is displayed. For example, by the user's selection of a tub B109 in FIG. 19, the presentation unit 7 changes to a screen of external data as shown in FIG. 20. In this way, by changing the screen, object data of join operation which is internal data or external data can be clearly presented to the user.

For example, in the case of displaying external data from a screen of FIG. 18, the external data acquisition unit 9 decides whether external data (including dictionary data) corresponding to connection information (stored in the external DB connection information memory 3) is already stored in the external data memory 2. If the external data is already stored in the external data memory 2 (steps S111~S112) and if it is necessary to reacquire the external data from an external DB because of schema change of the external DB (step S113), the external data is reacquired by connecting to the external DB. If the external data is stored in the external data memory 2 (step S112) and if it is not necessary to reacquire the external data from the external DB (step S113), the external data stored in the external data memory 2 is utilized.

On the other hand, if the external data is not stored in the external data memory 2 (step S112), the external data acquisition unit 9 examines whether an external database corresponding to connection information exists by referring to the connection information stored in the external DB connection information memory 3. If the external database exists (step S114), the external data acquisition unit 9 acquires the external data by accessing the external database using connection information of the external database (step S115).

The external data acquired from the external database is stored in the external data memory 2. In this case, if the external data does not have a hierarchical structure (step S116), the external data is stored based on a hierarchical structure stored in the internal data memory 1 (step S117~S119).

For example, in the first external DB 51, a hierarchical structure (schema data) shown in FIG. 4 and a table registered in each item of the hierarchical structure are stored. After acquiring these data by the external data acquisition unit 9, the external data processing unit 14 assigns each class (class identifier) to the external data (step S117), assigns a unique identifier of property to each item (or property name) of each class in the external data (step S118), and assigns a data type to each item or each property by deciding the data type of a value (or property value) of each item.

As a result, at step S120, the external data is stored in the same way as a tree structure stored in the external data memory 1 as shown in FIG. 20. Briefly, a hierarchical structure corresponding to external data stored in the first external DB 51 and the second external DB 52 is stored.

For example, when external data stored in the first external DB 51 having a hierarchical structure is stored in the external data memory 2, a hierarchical structure of the external data is registered in a node 401. In this case, as for a property of each class comprising the hierarchical structure of the external data, a unique identifier of property such as BSU is assigned, and a data type of each property value defined in schema data of the external data is additionally stored. Furthermore, when external data of a table format stored in the second external DB 52 is stored in the external data memory 2, the table is registered in a node 402. In this case, item of the external data is linked to a class corresponding to the node 402 as a property; a unique identifier of property such as BSU is assigned to each property; and a data type of each property value is additionally stored.

At step S123, if information related to an external database storing a data type indicated by the user is not stored in the external DB connection information memory 3 and if new external database is added, the user may directly indicate the external database (step S125). For example, by pushing a button B105 "ADD/DELETE EXTERNAL DB" shown in FIG. 18, a screen to input information related to external database is displayed as shown in FIG. 21. By inputting an identifier (name) of the user's desired external database, connection information such as an IP or a host name, and table information such as a table name or a table type, these information are stored in the external DB connection information memory 3 (step S125). After that, the external data acquisition unit 9 acquires the external data by accessing the desired external DB using the connection information, and stores the acquired external data in the external data memory 2 (steps S114~S120).

The second indication unit 8 reads external data from the external data memory 2, and, for example, displays a screen as shown in FIG. 18 (step S122). In the screen of FIG. 18, a root node 300 "UNIVERSAL ROOT" of all dictionary trees (including external data copied with a hierarchical structure) processed in the system is set, a lower node 301 "INTERNAL DATABASE" of the root node 300 is set as an upper node of all dictionary trees of internal data is set, and a hierarchical tree (dictionary tree) acquired from the internal data is displayed as a lower node of the node 301. A dictionary tree of external data acquired from the first external DB 51 and the second external DB 52 is respectively displayed as a node 303 "EX_DATABASE01" and a node 304 "EX_DATABASE02" which are a lower node of the node 302 "EXTERNAL DATABASE". By selecting an identifier of a table (For example, "table001", "table101") of contents data registered in any class comprising the tree, the user's desired table is selected (step S124). This selected table is regarded as the second table.

Figure 17:
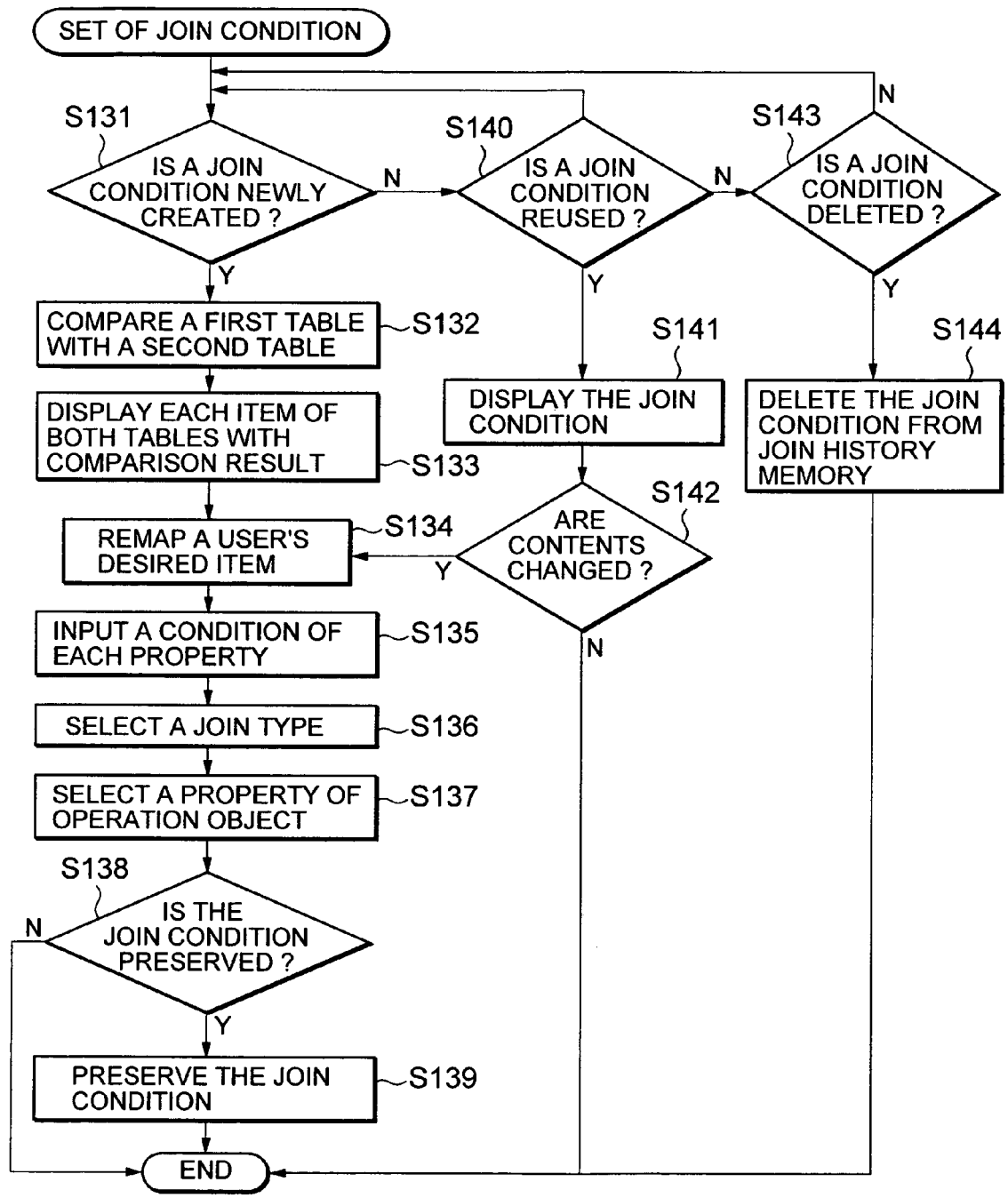
FIG. 17 is a flowchart of set of a join condition.

Next, the processing of step S3 of FIG. 11 is explained in detail by referring to a flowchart of FIG. 17. For example, when a button B102 "CREATE JOIN CONDITION" of FIG. 18 is pushed (step S131), the join condition input unit 10 compares each property name in the first table with each item name (property name) in the second table, and searches for an item (property) having the same name or identifier as the property of the first table from the second table (step S132). Each property of the first table and each item (each property) of the second table are displayed. In this case, the property and the item of which names or identifiers are the same are correspondingly displayed as shown in FIG. 22 (step S133).

In FIG. 22, a table of internal data is "TB01" and a table of external data is "table01" stored in the second external DB 52. In this case, the second table "table 01" includes item such as "product code", "number of stocks" and "number of arrival of goods". The item "product code" exists in the first table "TB01". Accordingly, in FIG. 22, "product code" of the second table and "product code" of the first table are displayed in the same row. These are regarded as the same property because each identifier (BSU) of the property is same.

As a result, a user can select and set a desired join condition from prepared candidates without manually setting a troublesome join condition. The hierarchical database has a characteristic of inheritance of property from upper level class to lower level class. A join condition registered in the upper level class is usually applied to the lower level class. Accordingly, by displaying the join condition on the tree, the user can easily select not only a class registered as an operation object of the join condition but also the lower level class as an operation object of the same join condition.

Even if a property name and a data type of two properties are the same in two tables of usual relational database, it is not always guaranteed that the two properties perfectly coincide. However, in a hierarchical database of this system, a property is managed by a unique identifier (BSU) and the property defined in an upper level class is inherited to a lower level class. Accordingly, in the lower class of the upper level class defining the property, it is guaranteed that the lower level class has the same property as the upper level class. By utilizing this, in a screen of FIG. 22, two coincided properties between two tables are presented to the user as default properties to be joined. As a result, supplemental input for the user to easily describe a join condition is possible.

In the first table and the second table displayed on a screen of FIG. 22, a join condition is selected from coincided item names and property names (step S133). For example, in FIG. 22, "product code" of the first table coincides with "product code" of the second table. In the case of selecting these properties, the user pushes a button B23 "DETAIL CONDITION".

Alternatively, as shown in FIG. 23, an item (a property) in the second table to be the same as a property in the first table (or able to be the same as the property in the first table even if the data type is taken into consideration) is displayed as a pull down menu. In this case, the user can respectively set the item as the join condition on the pull down menu (step S134). If necessary, the user may input the join condition property for each property mapped for joining (step S135). Usually, two properties having coinciding values are joined (equivalent join).

Figure 24:
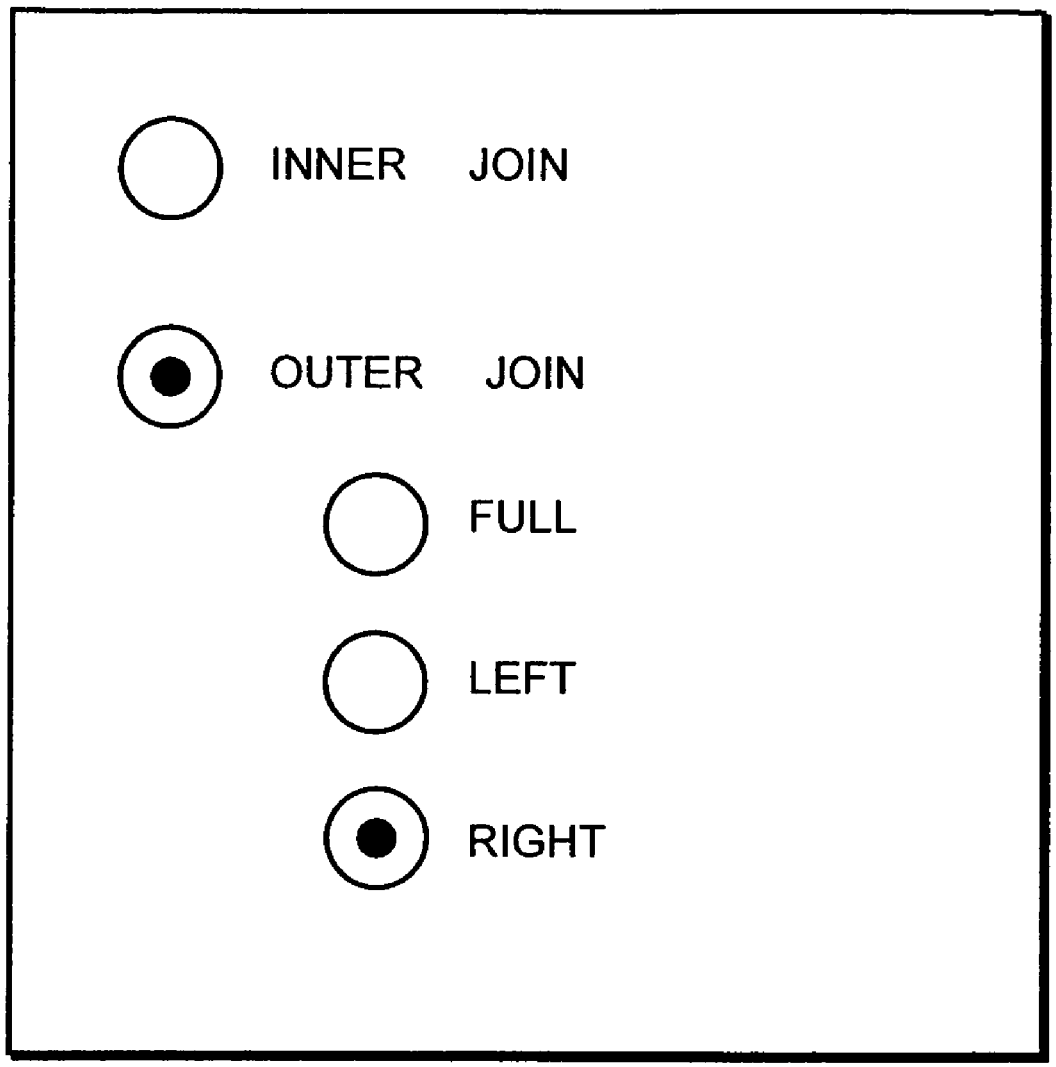
FIG. 24 is one example of a screen to set a join type.

Furthermore, if necessary, a join type can be selected (step S136). In the present embodiment, left outer join is set as a defined value in usual join operation because the first table is regarded as an origin. However, for example, by selecting a button B24 "JOIN TYPE SET" on a screen of FIG. 22, another screen of FIG. 24 is displayed and the join type can be selected. In the case of joining the first table with the second table, a method for joining is set on this screen. For example, in FIG. 24, the join type that the first table is located at the right side and joined with the second table as outer join is set.

Furthermore, from a plurality of properties of the first table and a plurality of properties of the second table, properties as object of join operation may be selected (step S137). For example, in a screen of FIG. 22, the user inputs a check into an item row "DISPLAY" corresponding to the property as object of join operation. In this case, the number of data of join operation can be reduced. As for the created join condition, by selecting a button B21 "OK" in FIG. 22, a message of inquiry whether set contents are preserved on this screen is displayed (step S138). When the user selects "preservation" (not shown in FIG. 22), a name is assigned to the set contents on the screen. The set contents are stored in the past join operation memory 4 as a join history (step S139).

Furthermore, a join condition can be reused by selecting from the join history. Briefly, assume that the preserved join condition (join condition 001, join condition 002) is selected for the second table of FIG. 18. By selecting a button B103 "CHANGE JOIN CONDITION" (step S140), the join condition input unit 10 reads the selected join condition from the join history stored in the past join operation memory shown in FIG. 25, and displays the read join condition (step S141).

The past join operation memory 4 stores the join condition used for join operation in the past as the join history. For each join condition, the past join operation memory 4 stores an identifier (ID) to discriminate the join condition, a name of the join condition, the first table and the second table to which the join condition is applied, a property indicated as display object for join operation result by applying the join operation, a property and a condition indicated as a join operation object, and a join type.

A user can use the displayed join condition as a join condition of this time. If the user changes the displayed join condition or creates a new join condition by reusing the displayed join condition (step S142), the user executes an input operation of join condition as mentioned-above (steps S134~S137). By pushing a button B21 "OK" in FIG. 22, the edited join condition is stored in the past join operation memory 4 by adding a name.

Furthermore, by pushing a button B104 "DELETE JOIN CONDITION" in FIG. 18 (step S143), the join condition stored in the past join operation memory 4 can be deleted (step S144). At step S4, when an execution indication of join operation between the first table and the second table is input, the join operation unit 11 executes a join operation of both tables. Briefly, based on a join condition and a join type input by the join condition input unit 10, a join operation is executed between the first table of contents data of predetermined number (For example, one hundred) and the second table of external data each presented by the presentation unit 17 at the present time.

As for a join operation, as shown in FIG. 7, a value corresponding to a property or an item indicated as a retrieval condition is searched. In record data of the first table and record data of the second table, two record data of which values corresponding to the indicated property or item are the same are joined, and a join table is created as shown in FIGS. 7D and 7E.

The join operation unit 11 stores a table obtained as join operation result in the joined data memory 5 and provides the table to the joined data output unit 12. The joined data output unit 12 sends the received joined data to the user terminal TE of a request source, or outputs it through a display of the server apparatus 50. The user terminal TE of the request source outputs the received joined data through a predetermined display.

As mentioned-above, in the first embodiment, contents data of the user's desired class stored in a hierarchical database of internal data are divided into a plurality of groups each including contents data of predetermined number. The contents data of each group is displayed in order, and joined with a table of another record data. Accordingly, the number of data as a join operation object can be reduced, and a load of join operation processing also can be reduced. Furthermore, if the user's selected contents data in the contents data of the group is regarded as a processing object of a join operation, the number of data of the processing object can be further reduced.

The external data acquired from an external database having a hierarchical structure (class system) different from an internal database is stored as a part of the hierarchical structure of the internal database. In this case, as shown in FIG. 18, a class or a table in the external data to be joined with a table of the internal data can be selected from a tree displayed on a GUI (Graphic User Interface).

In each property item of a table (the first table) of the internal data, a property item having a name or identifier the same as a property item of a table (the second table) of the external data is searched. For example, as shown in FIG. 22, a look-up table of property items of the same name or the same identifier is displayed. As a result, a user can easily set a join condition used for a join operation between the first table and the second table. In this case, a set screen of join operations displaying the look-up table is called a class operation page.

The join condition used for join operation is stored as a join history, and reused in the case of inputting a join operation to be used for the next join operation. As a result, the user can easily set the join condition.

Order of operation of classes as object of join operation may be indicated and preserved. In this case, as for the user's selected class displayed on the GUI, the registered join condition may be read out and operated in order.

Furthermore, order of operation of classes as object of join operation may be indicated and preserved. As for all classes as operation object, the registered join condition related to the user's selected class displayed on the GUI or the upper level class may be read out and used as join operation. In the join operation, indication of order of join table is effective for reduction of operation processing time. Accordingly, storing of the join order is very important to reduce the operation processing time.

Furthermore, even if a property of the same name or the same identifier does not exist between a class and another class as an object of a join operation, the property of the same data type between the class and another class may be regarded as the same property. In this case, these properties may be correspondingly presented to the user as shown in FIG. 22.

The Second Embodiment

Figure 26:
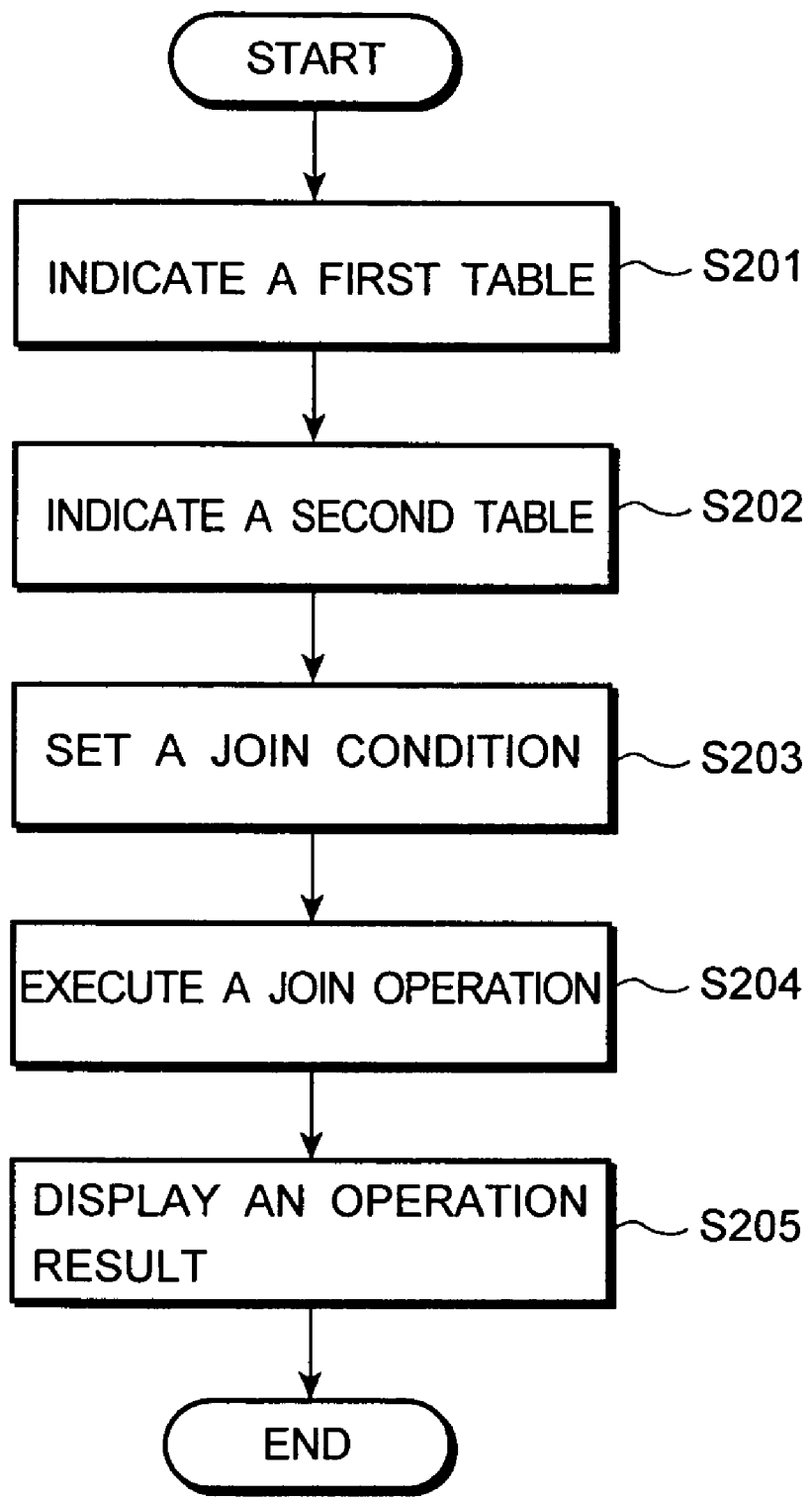
FIG. 26 is a flowchart of the data processing method according to a second embodiment of the present invention.

In the first embodiment, a table (the first table) of internal data is joined with a table (the second table) of external data. The same methods can be applied to the case of joining two tables of internal data. Feature point different from the first embodiment is explained by referring to a flowchart of FIG. 26.

First, at step S201, as shown in the flowchart of FIG. 12, the first indication unit 6 indicates a table of desired contents data from the internal data memory 1. Briefly, one class (It is called a first class) of classes comprising a hierarchical structure stored in the internal data memory 1 is indicated, and the table of contents data registered in the first class is selected (step S101). The presentation unit 7 divides contents data of the table into a plurality of groups each including contents data of predetermined number (For example, one hundred) (step S102), and displays a table of contents data in the first group as shown in FIG. 8 (step S103). This table (The first table) of presented contents data is regarded as a processing object of join operation. If necessary, in the contents data of the first table, a user's selected contents data (selected row of the contents data) is only regarded as a processing object of join operation as shown in FIG. 9 (step S104). This processing is executed at step S201.

Next, in the same way as step S201, the first indication unit 6 indicates the second table to be joined with the first table from the internal data memory 1 (step S202). Briefly, another one (It is called a second class) of classes comprising the hierarchical structure stored in the internal data memory 1 is indicated, and a table of contents data registered in the second class is selected (step S101). The presentation unit 7 divides the contents data of the table into a plurality of groups each including contents data of a predetermined number (For example, one hundred) (step S102), and displays a table of contents data in the first group as shown in FIG. 8 (step S103). This table (The second table) of presented contents data is regarded as a processing object of a join operation. If necessary, from the contents data of the second table, a user's selected contents data (selected row of the contents data) is only regarded as a processing object of a join operation as shown in FIG. 9 (step S104). This processing is executed at step S202.

Next, in the same way as the flowchart of FIG. 17, a join condition is set (step S203). When an execution indication of join operation between the first table and the second tables is input, the join operation unit 11 executes a join operation of both tables (step S204). A new table obtained as the join operation result is stored in the joined data memory 5. The joined data output unit 12 displays the new table through the user terminal TE of request source or a display of the server apparatus 50 (step S205).

The Third Embodiment

Hereinafter, features of the third embodiment different from the first embodiment are explained.

In the case of a join operation between RDB tables, if each value of many items (properties) indicated as an operation join condition coincides between two tables, the greater the number of coincided items, the greater is the number of join operations. Accordingly, in order to execute the join operation with a small number of operations, items (properties) having as few as possible coincided values between two tables should be indicated.

A key property in a table is used for uniquely discriminating each record data in the table. A plurality of key properties can also be used. In this case, the record data is uniquely discriminated by a value of a combination of the plurality of key properties. Accordingly, the key property included in both tables is first presented to the user as a join condition in order to urge the user to select the key property as the join condition. As a result, the number of join operations can be controlled.

Next, processing of the third embodiment is explained by referring to FIGS. 27 and 28. FIG. 27 is one example of contents data of "mouse", and FIG. 28 is one example of contents data of "notebook PC". By setting a property "INTERFACE" in the contents data of mouse and a property "MOUSE INTERFACE" in the contents data of notebook PC as a join operation, both contents data of FIGS. 27 and 28 can be joined. However, in comparison with the join condition "MOUSE. INTERFACE=NOTEBOOK PC. MOUSE INTERFACE", a processing time of operation by a joint condition including "PRODUCT CODE" as the key property ("MOUSE. PRODUCT CODE=NOTEBOOK PC. RECOMMENDABLE MOUSE PRODUCT CODE") is short.

Concretely, in the case of the join condition "MOUSE. INTERFACE=NOTEBOOK PC. MOUSE INTERFACE", for example, in the contents data of mouse of FIG. 27, the interface corresponding to the product code "MR001" is "USB". Accordingly, in the contents data of notebook PC of FIG. 28, the contents data of five product codes "Dyna100", "Dyna101", "Dyna102", "Dyna103", "Dyna104" each corresponding to the mouse interface "USB" is joined with the contents data of mouse of product code "MR001", and five joined contents data are generated. In the same way, in the contents data of mouse of FIG. 27, an interface corresponding to the product code "MR002" is "USB". Accordingly, in contents data of notebook PC of FIG. 28, the contents data of five product codes "Dyna100", "Dyna101", "Dyna102", "Dyna103", "Dyna104" each corresponding to mouse interface "USB" is joined with the contents data of mouse of product code "MR002", and five joined contents data are generated. In the contents data of mouse of FIG. 27, as for contents data corresponding to two product codes "MR003" and "MIR002", five joined contents data are respectively generated.

On the other hand, in the case of the join condition "MOUSE. PRODUCT CODE=NOTEBOOK PC. RECOMMENDABLE MOUSE PRODUCT CODE", for example, as for contents data of mouse corresponding to product code "MR001" in FIG. 27, product code of contents data of notebook PC corresponding to recommendable mouse product code "MR001" in FIG. 28 is "Dyna100" and "Dyna101". Accordingly, contents data of two product codes "Dyna100" and "Dyna101" is joined with the contents data of mouse of product code "MR001", and two joined contents data are generated. In the same way, as for contents data of mouse corresponding to product code "MR002" in FIG. 27, product code of contents data of notebook PC corresponding to recommendable mouse product code "MR002" in FIG. 28 is "Dyna102" and "Dyna103". Accordingly, contents data of two product codes "Dyna102" and "Dyna103" is joined with the contents data of mouse of product code "MR002", and two joined contents data are generated.

As for another contents data of mouse, the number of contents data of notebook PS to be joined with one contents data of mouse can be reduced. In this way, as a join condition to join two tables, a property of the same value included in smaller number of contents data in both tables is used. For example, a property of value able to discriminate each contents data, i.e. "product code" (It is called a key property), is used. As a result, the number of data as join operation object can be reduced.

Thus, the join condition input unit 10 extracts a key property from two tables of external data and internal data, and presents the key property as shown in FIG. 22. In FIG. 22, as for the key property in properties of the first table and the second table, "○" is displayed in key row. By recommending a user to indicate the key property as a join condition, the join condition having the least number of join operations can be indicated. As the recommendation method, in the case of displaying an input screen of join conditions shown in FIG. 22, each key property of the first table and the second table is correspondingly presented. If the key property is not selected as a join condition, when the join condition is determined for a user (For example, "OK" button B21 is pushed in FIG. 22), then an alarm message is output in order to urge the user to indicate the key property.

Furthermore, as the join condition, in addition to equivalent join, non-equivalent join can be input. For example, in the case of indicating a join condition as a key property "PRODUCT CODE" in the first table and a key property corresponding to the "PRODUCT CODE" in the second table, a button B23 "DETAIL SET" becomes active by indicating the properties of the first table and the second table. Accordingly, by the user's push of the button B23, "non-equivalent join" can be set.

The Fourth Embodiment

Hereinafter, features of the fourth embodiment different from the first embodiment are explained.

In a database having hierarchical structure, a property defined in an upper level class is inherited to a lower level class. Accordingly, a join condition (past join operation) defined in some class can be applied to the lower level class.

For example, assume that a table "TB10" shown in FIG. 29 is registered in "PC MAIN BODY" node 102 of FIG. 2, a table "TB01" shown in FIG. 3 is registered in "NOTEBOOK PC" node 105 of FIG. 2, and a table "TB11" shown in FIG. 30 is registered in "DESKTOP PC" node 106 of FIG. 2. The table "TB10" of FIG. 29 is a table defining schema (property name) only. However, contents data may be registered.

Furthermore, in a hierarchical structure of database stored in the first external DB 51 shown in FIG. 4, assume that a table "table00" shown in FIG. 31 is registered in "PC MAIN BODY STOCKS" node; a table "table01" shown in FIG. 5 is registered in "NOTEBOOK PC STOCKS" node; and a table "table02" shown in FIG. 32 is registered in "DESKTOP PC STOCKS" node. The table "table00" of FIG. 31 is a table defining schema (property name) only. However, contents data may be registered.

A join condition (past join operation) to obtain PC stocks by joining the table "TB10" of "PC MAIN BODY" node 102 of FIG. 2 with the table "table00" of "PC MAIN BODY STOCKS" node of FIG. 4 is registered. The join condition is "JOIN CONDITION 003: TEMPLATE OF STOCKS CHECK" in FIG. 25. Briefly, a value corresponding to property "PRP003: PRODUCT CODE" of "TB10" of FIG. 29 is joined with the same value corresponding to property "PRP003: PRODUCT CODE" of "table00" of FIG. 31. Thus, each value corresponding to two properties "PRP003: PRODUCT CODE" and "PRP101: NUMBER OF STOCKS" (indicated as display property in FIG. 25) is displayed.

Figure 33:
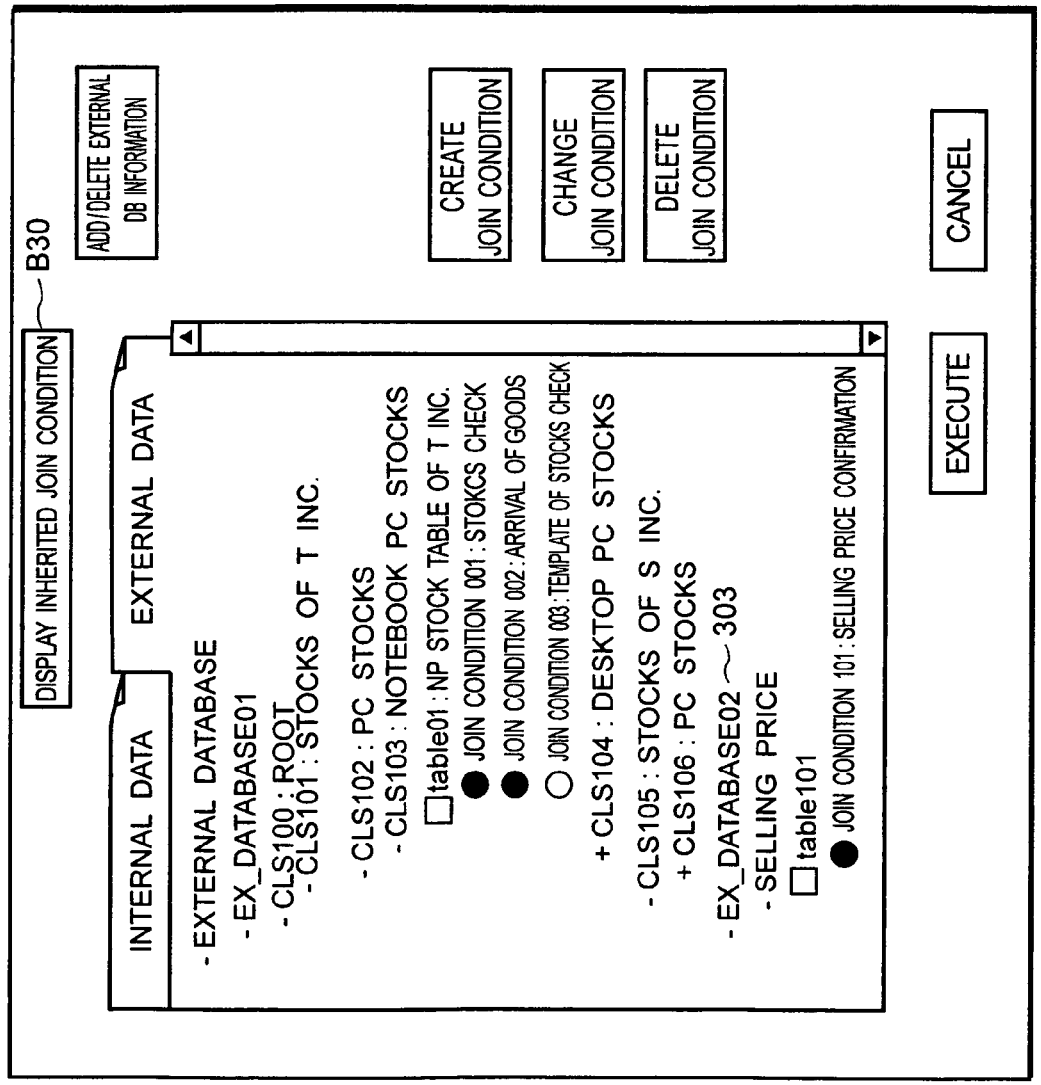
FIG. 33 is one example of screen to select external data and a join condition.

For example, in a screen to select external data and a join condition shown in FIG. 33, by the user's selection of "DISPLAY INHERITED JOIN CONDITION" button B30, the inherited join condition "JOIN CONDITION 003: TEMPLATE OF STOCKS CHECK" is displayed. This join condition is used to join a table "TB10" with a table "table00". Accordingly, a property used by the join condition "JOIN CONDITION 003: TEMPLATE OF STOCKS CHECK" is inherited to a lower level class of the table "TB10" and the table "table00". Concretely, this join condition can be utilized to join a table "table01" registered in a lower node "NOTEBOOK PC STOCKS" of node "PC MAIN BODY STOCKS" (shown in FIG. 4) registering the table "table00" with a table "TB01" registered in a lower node 105 "NOTEBOOK PC" of node 102 "PC MAIN BODY" (shown in FIG. 2) registering the table "TB10". In FIG. 33, "JOIN CONDITION 003" is displayed as a join condition of a table "table01".

In this way, by utilizing a join condition used for join operation between tables of upper level class, the condition to effectively execute join operation between tables of lower level class can be simply input.

A procedure to utilize a join condition inherited from an upper level class is explained. First, at step S1 of FIG. 11, a table (the first table) of internal data is indicated on a screen shown in FIG. 13 (For example, a table "TB01" is indicated). At step S2 of FIG. 11, a table (the second table) of external data is indicated on a screen shown in FIG. 33 (For example, a table "table01" is indicated. At step S3 of FIG.

Figure 34:
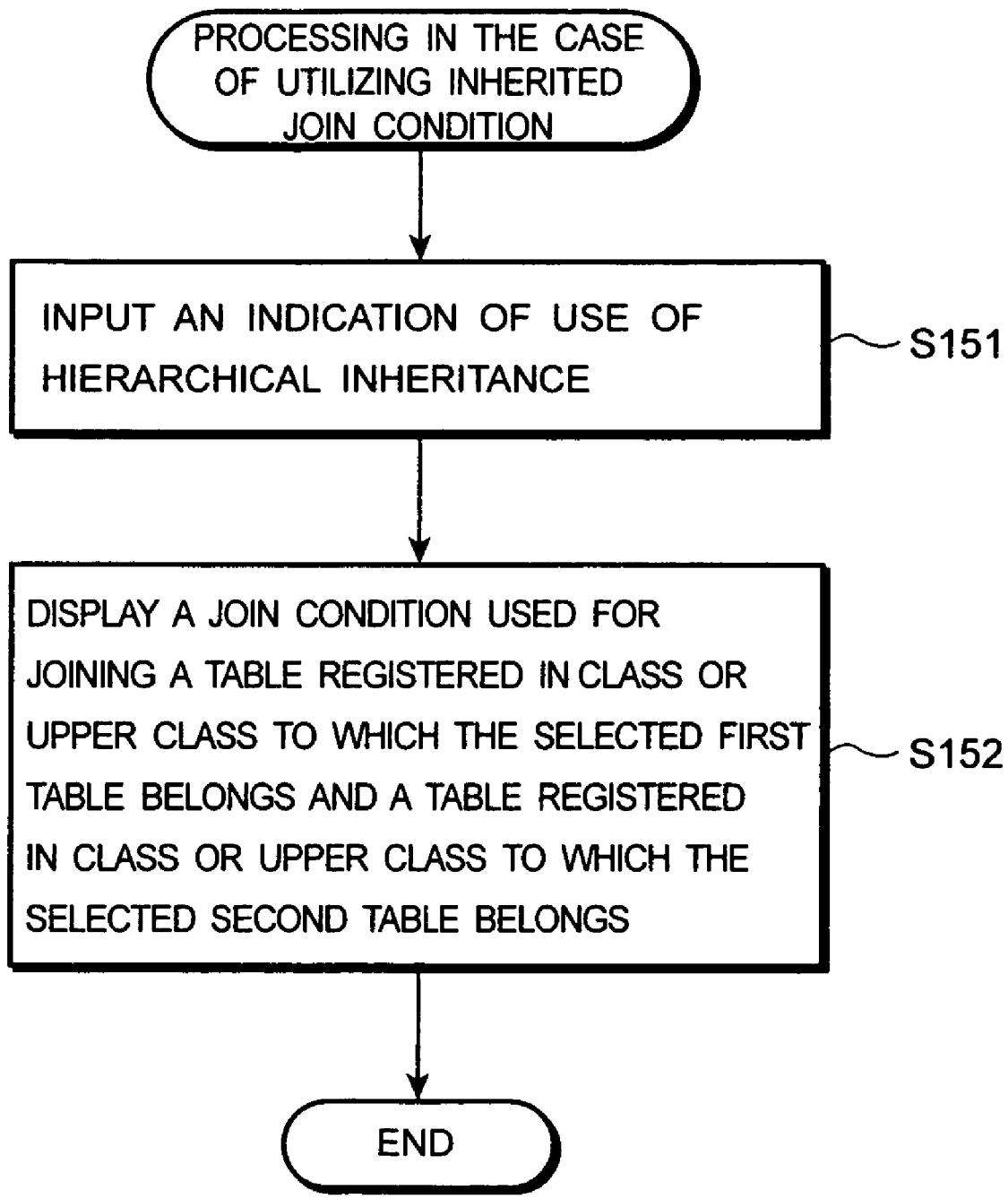
FIG. 34 is a flowchart of processing in the case of utilizing a join condition inherited from an upper level class.

11, a join condition is set. Processing of steps S140–141 in FIG. 17 corresponds to processing in FIG. 34.

By the user's selection of a button B30 on a screen of FIG. 33 (step S151 of FIG. 34), the second indication unit 8 reads a join condition (For example, "JOIN CONDITION 003: TEMPLATE OF STOCKS CHECK") from the join history stored in the past join operation memory 4. The join condition was already used to join a table registered in a class (or upper class) to which the first table belongs with a table registered in a class (or upper class) to which the second table belongs. This join condition is displayed as shown in FIG. 33 (step S152 of FIG. 34).

As mentioned-above, in the present invention, in the case of joining a table of contents data registered in a hierarchical database with another table of record data, the number of processing of join operation can be reduced, and input of join condition can be easily executed for the user.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the storage devices may be combined into one memory, or more than one memory may be used. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through a network. Furthermore, in the present invention, the computer is not limited to a personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing data, comprising:
a database configured to hierarchically store a plurality of classes and a plurality of contents data corresponding to each of the plurality of classes, a class having a plurality of properties, the plurality of properties including a property peculiar to the class and a property inherited from an upper level class, each contents data having a value of each of the plurality of properties;
a display unit to hierarchically display the plurality of classes;
an indication unit configured to select a class from the plurality of classes;
wherein the display unit divides the plurality of contents data of the selected class into a plurality of groups, and displays a first table of contents data of a group selected from the plurality of groups;
a memory to store a second table of a plurality of record data, each record data having a value of each of a plurality of items;
wherein the indication unit selects a first property from the plurality of properties of the selected class, and selects a first item from the plurality of items; and
a generation unit configured to join contents data of the first table with record data of the second table on condition that a value of the first property of the contents data is equal to a value of the first item of the record data, and to generate a third table of a plurality of joined data, each joined data having a value of each of the plurality of properties of the selected class and a value of each of the plurality of items.

2. The apparatus according to claim 1,
wherein said display unit displays contents data of each of the plurality of groups in order, and
wherein said indication unit selects a user's desired contents data from the contents data of each group displayed in order.

3. The apparatus according to claim 1,
wherein said generation unit extracts a property having the same name or identifier as any of the plurality of items,
wherein said display unit displays a correspondence table having the property and the items having the same name or identifier, and
wherein said indication unit selects the first property and the first item from the correspondence table.

4. The apparatus according to claim 1,
wherein said indication unit selects a user's desired properties from the plurality of properties of the selected class,
wherein said display unit displays the first table having a value of each of the user's desired properties, and
wherein said generation unit jointly generates the third table having the value of each of the user's desired properties and the value of each of the plurality of items.

5. The apparatus according to claim 1,
wherein said indication unit selects a user's desired contents data from the contents data of the selected class, and
wherein said generation unit jointly generates the third table having the user's desired contents data and the value of each of the plurality of items.

6. The apparatus according to claim 1,
wherein said indication unit selects a user's desired properties from the plurality of properties in the first table, and selects a user's desired items from the plurality of items in the second table, and wherein said generation unit jointly generates the third table having the contents data of the user's desired properties and the record data of the user's desired items.

7. The apparatus according to claim 1, further comprising:
a connection information memory configured to store connection information of each external database, and
an acquisition unit configured to acquire the second table from an external database using the connection information of the external database through a network.

8. The apparatus according to claim 7,
wherein said acquisition unit, if the plurality of record data in the second table includes a hierarchical structure, assigns a class identifier to each record data, and assigns a property identifier and a data type to each item of the record data.

9. The apparatus according to claim 8,
wherein said memory hierarchically stores the plurality of record data in the second table, and
wherein said display unit displays a hierarchical structure merging the plurality of classes in the first table and the plurality of record data in the second table.

10. The apparatus according to claim 8, further comprising:
a past join operation memory configured to store a join condition wherein the value of the first property is equal to the value of the first item.

11. The apparatus according to claim 10,
wherein said display unit additionally displays the join condition in the hierarchical structure, and
wherein said indication unit selects a user's desired join condition from the join conditions displayed.

12. The apparatus according to claim 11,
wherein said display unit displays a join condition related to a property included in the selected class or the upper level class.

13. The apparatus according to claim 1,
wherein the plurality of properties in the first table includes a key property, a value of the key property discriminating each contents data in the first table, and
wherein the plurality of properties in the second table includes a key property, a value of the key property discriminating each record data in the second table.

14. The apparatus according to claim 13,
wherein said display unit preferentially displays a correspondence table having the key property in the first table and the key property in the second table for indication of the join condition.

15. The apparatus according to claim 3,
wherein said display unit displays a screen to select a join type including an inner join and an outer join, and
wherein said indication unit selects a user's desired join type on the screen.

16. An apparatus for processing data, the apparatus including a processor, the apparatus comprising:
a database configured to hierarchically store a plurality of classes and a plurality of contents data corresponding to each of the plurality of classes, a class having a plurality of properties, the plurality of properties including a property peculiar to the class and a property inherited from an upper level class, each contents data having a value of each of the plurality of properties;
a display unit to hierarchically display the plurality of classes;
an indication unit configured to select a first class and a second class from the plurality of classes;
wherein the display unit divides the plurality of contents data of the first class into a plurality of groups, displays a first table of contents data of a first group selected from the plurality of groups, divides the plurality of contents data of the second class into a plurality of groups, and displays a second table of contents data of a second group selected from the plurality of groups;
a retrieval unit configured to extract properties commonly included in the plurality of properties of the first class and the plurality of properties of the second class,
wherein the indication unit selects a property from the extracted properties; and
a generation unit configured to join contents data of the first table with contents data of the second table on condition that a value of the selected property of the first table is equal to a value of the selected property of the second table, and to generate a third table of a plurality of joined data, each joined data having a value of each of the plurality of properties of the first class and a value of each of the plurality of properties of the second class.

17. A method for processing data, comprising:
acquiring a hierarchical structure of a plurality of classes and a plurality of contents data corresponding to each of the plurality of classes from a database, a class having a plurality of properties, the plurality of properties including a property peculiar to the class and a property inherited from an upper level class, each contents data having a value of each of the plurality of properties;
hierarchically displaying the plurality of classes;
selecting a class from the plurality of classes;
dividing the plurality of contents data of the selected class into a plurality of groups;
displaying a first table of contents data of group selected from the plurality of groups;
acquiring a second table of a plurality of record data from a memory, each record data having a value of each of a plurality of items;
selecting a first property from the plurality of properties of the selected class;
selecting a first item from the plurality of items;
joining contents data of the first table with record data of the second table on condition that a value of the first property of the contents data is equal to a value of the first item of the record data; and
generating a third table of a plurality of joined data, each joined data having a value of each of the plurality of properties of the selected class and a value of each of the plurality of items.

18. A method for processing data, comprising:
acquiring a hierarchical structure of a plurality of classes and a plurality of contents data corresponding to each of the plurality of classes from a database, a class having a plurality of properties, the plurality of properties including a property peculiar to the class and a property inherited from an upper level class, each contents data having a value of each of the plurality of properties;
hierarchically displaying the plurality of classes;
selecting a first class and a second class from the plurality of classes;
dividing the plurality of contents data of the first class into a plurality of groups;
displaying a first table of contents data of a first group selected from the plurality of groups;

dividing the plurality of contents data of the second class into a plurality of groups;

displaying a second table of contents data of a second group selected from the plurality of groups;

extracting properties commonly included in the plurality of properties of the first class and the plurality of properties of the second class;

selecting a property from the extracted properties;

joining contents data of the first table with contents data of the second table on condition that a value of the selected property of the first table is equal to a value of the selected property of the second table; and generating a third table of a plurality of joined data, each joined data having a value of each of the plurality of properties of the first class and a value of each of the plurality of properties of the second class.

19. A computer program product stored on a computer-readable medium, the computer program product comprising:

a computer readable program code embodied in said product for causing a computer to process data, said computer readable program code comprising:

a first program code to acquire a hierarchical structure of a plurality of classes and a plurality of contents data corresponding to each of the plurality of classes from a database, a class having a plurality of properties, the plurality of properties including a property peculiar to the class and a property inherited from an upper level class, each contents data having a value of each of the plurality of properties;

a second program code to hierarchically display the plurality of classes;

a third program code to select a class from the plurality of classes;

a fourth program code to divide the plurality of contents data of the selected class into a plurality of groups;

a fifth program code to display a first table of contents data of a group selected from the plurality of groups;

a sixth program code to acquire a second table of a plurality of record data from a memory, each record data having a value of each of a plurality of items;

a seventh program code to select a first property from the plurality of properties of the selected class;

an eighth program code to select a first item from the plurality of items;

a ninth program code to join contents data of the first table with record data of the second table on condition that a value of the first property of the contents data is equal to a value of the first item of the record data; and a tenth program code to generate a third table of a plurality of joined data, each joined data having a value of each of the plurality of properties of the selected class and a value of each of the plurality of items.

20. A computer program product stored on a computer-readable medium, the computer program product comprising:

a computer readable program code embodied in said product for causing a computer to process data, said computer readable program code comprising:

a first program code to acquire a hierarchical structure of a plurality of classes and a plurality of contents data corresponding to each of the plurality of classes from a database, a class having a plurality of properties, the plurality of properties including a property peculiar to the class and a property inherited from an upper level class, each contents data having a value of each of the plurality of properties;

a second program code to hierarchically display the plurality of classes;

a third program code to select a first class and a second class from the plurality of classes;

a fourth program code to divide the plurality of contents data of the first class selected from the plurality of classes into a plurality of groups;

a fifth program code to display a first table of contents data of a first group selected from the plurality of groups;

a sixth program code to divide the plurality of contents data of the second class into a plurality of groups;

a seventh program code to display a second table of contents data of a second group selected from the plurality of groups;

an eighth program code to extract properties commonly included in the plurality of properties of the first class and the plurality of properties of the second class;

a ninth program code to select a property from the extracted properties;

a tenth program code to join contents data of the first table with contents data of the second table on condition that a value of the selected property of the first table is equal to a value of the selected property of the second table; and an eleventh program code to generate a third table of a plurality of joined data, each joined data having a value of each of the plurality of properties of the first class and a value of each of the plurality of properties of the second class.

* * * * *